United States Patent
Kawabata

(10) Patent No.: US 10,560,847 B2
(45) Date of Patent: *Feb. 11, 2020

(54) MOBILE TERMINAL, LOCK STATE CONTROL PROGRAM FOR MOBILE TERMINAL, AND A METHOD FOR CONTROLLING LOCK STATE OF MOBILE TERMINAL

(71) Applicant: KYOCERA Corporation, Kyoto-shi, Kyoto (JP)

(72) Inventor: Ryosuke Kawabata, Daito (JP)

(73) Assignee: Kyocera Corporation, Kyoto (JP)

( * ) Notice: Subject to any disclaimer, the term of this patent is extended or adjusted under 35 U.S.C. 154(b) by 13 days.

This patent is subject to a terminal disclaimer.

(21) Appl. No.: 16/037,323

(22) Filed: Jul. 17, 2018

(65) Prior Publication Data

US 2018/0324593 A1 Nov. 8, 2018

Related U.S. Application Data

(63) Continuation of application No. 15/498,073, filed on Apr. 26, 2017, now Pat. No. 10,051,472, which is a
(Continued)

(30) Foreign Application Priority Data

Aug. 27, 2010 (JP) ................................ 2010-190840
Oct. 27, 2010 (JP) ................................ 2010-240363

(51) Int. Cl.
*H04W 12/08* (2009.01)
*G06F 3/0488* (2013.01)
(Continued)

(52) U.S. Cl.
CPC ........ *H04W 12/08* (2013.01); *G06F 3/04883* (2013.01); *G06F 21/36* (2013.01); *H04M 1/67* (2013.01); *H04M 2250/22* (2013.01)

(58) Field of Classification Search
CPC ... H04M 1/67; H04M 2250/22; H04W 12/08; G06F 3/04883; G06F 21/36
See application file for complete search history.

(56) References Cited

U.S. PATENT DOCUMENTS 8,355,698 B2   1/2013   Teng et al.
8,588,739 B2   11/2013  Kawabata
(Continued)

FOREIGN PATENT DOCUMENTS

JP   2000-358283 A   12/2000
JP   2007-013530 A   1/2007
(Continued)

OTHER PUBLICATIONS

Office Action dated Feb. 2, 2016, issued by Japanese Patent Office for Japanese Patent Application No. 2014-150557.
(Continued)

*Primary Examiner* — Kashif Siddiqui

(57) ABSTRACT

A mobile terminal is disclosed. The mobile terminal includes a touch panel and an input detection part, a display part, a determination part, and an execution part. The input detection part is configured to detect inputs to the touch panel. The display part is configured to display an object corresponding to a lock state in which predetermined processing based on inputs detected by the input detection part is not executed. The determination part is configured to determine whether or not a predetermined input to the object is detected by the input detection part. The execution part is configured to release the lock state and execute predetermined processing if the determination part determines that a predetermined input to the object is detected.

19 Claims, 15 Drawing Sheets

Related U.S. Application Data continuation of application No. 15/269,714, filed on Sep. 19, 2016, now Pat. No. 9,642,011, which is a continuation of application No. 14/849,332, filed on Sep. 9, 2015, now Pat. No. 9,467,544, which is a continuation of application No. 14/043,462, filed on Oct. 1, 2013, now Pat. No. 9,179,310, which is a continuation of application No. 13/218,365, filed on Aug. 25, 2011, now Pat. No. 8,588,739.

(51) Int. Cl.
  *G06F 21/36* (2013.01)
  *H04M 1/67* (2006.01)

(56) References Cited

U.S. PATENT DOCUMENTS

| | | | |
|---|---|---|---|
| 9,179,310 B2 | 11/2015 | Kawabata | |
| 9,642,011 B2 | 5/2017 | Kawabata | |
| 10,051,472 B2 * | 8/2018 | Kawabata | G06F 3/04883 |
| 2007/0150842 A1 | 6/2007 | Chaudhri et al. | |
| 2008/0060052 A1 | 3/2008 | Hwang et al. | |
| 2009/0094562 A1 | 9/2009 | Jeong et al. | |
| 2009/0295743 A1 | 12/2009 | Nakajoh | |
| 2010/0146384 A1 | 6/2010 | Peev et al. | |
| 2010/0146437 A1 | 6/2010 | Woodcock et al. | |
| 2010/0162182 A1 | 6/2010 | Oh et al. | |
| 2010/0248689 A1 | 9/2010 | Teng et al. | |
| 2011/0088086 A1 | 4/2011 | Swink et al. | |
| 2011/0256848 A1 | 10/2011 | Bok et al. | |
| 2011/0294467 A1 | 12/2011 | Kim et al. | |
| 2012/0046077 A1 | 2/2012 | Kim et al. | |
| 2014/0038562 A1 | 2/2014 | Kawabata | |
| 2015/0381789 A1 | 12/2015 | Kawabata | |

FOREIGN PATENT DOCUMENTS

| | | |
|---|---|---|
| JP | 2008-52584 A | 3/2008 |
| JP | 2009-521753 A | 6/2009 |
| JP | 2009-294725 A | 12/2009 |
| JP | 2010-238098 A | 10/2010 |
| KR | 2005-0030880 A | 3/2005 |
| KR | 2008-0079333 A | 8/2008 |
| KR | 2010-0073743 A | 7/2010 |
| WO | 2007/076210 A1 | 7/2007 |
| WO | 2010/065752 A | 6/2010 |
| WO | 2010/117642 A2 | 10/2010 |

OTHER PUBLICATIONS

Office action dated Dec. 3, 2013 issued by Japanese Patent Office for Japanese Application No. 2010-190840.
Office action dated Dec. 25, 2013 issued by Korean Patent Office for Korean Application No. 10-2013-0113897.
Office action dated Feb. 25, 2014 issued by Japanese Patent Office for Japanese Application No. 2010-190840.
Office action dated Apr. 8, 2014 issued by Japanese Patent Office for Japanese Application No. 2010-240363.
Office Action dated Jun. 27, 2014 issued by the Korean Patent Office for Korean Patent Application No. 2013-0113897.
Office Action dated Jan. 27, 2015 and issued by Japanese Patent Office for Japanese Application No. 2014-107761.
Office Action dated Apr. 21, 2015 and issued by Japanese Patent Office for Japanese Patent Application No. 2014-107761.
Office Action dated Jun. 9, 2015 and issued by Japanese Patent Office for Japanese Patent Application No. 2014-150557.
"OCTOBA; Flyscreen that enables checking various statuses during the locked state by customizing the lock screen; Must have Android applications for business use" p. 153, Ascii Media Works, Jul. 29, 2010, first issue.
Wessel van Waas, "Wessel's What's Next: Evolutie van het lockscreen" Androidworld, [online], Feb. 19, 2010 (searched on Jun. 2, 2015) URL <http://androidworld.nl/nieuws/wessels-whats-next-evolutie-van-het-lockscreen/>.
"Shahpur Azizpour, Review: Motorola Milestone (Droid) Android 2.0" Smartphoneblogging, [online], Dec. 31, 2009 (searched on Jun. 2, 2015) URL<http://smartphoneblogging.com/2009/12/review-motorola-milestone-droid-android-2-0/>.

* cited by examiner

MOBILE TERMINAL, LOCK STATE CONTROL PROGRAM FOR MOBILE TERMINAL, AND A METHOD FOR CONTROLLING LOCK STATE OF MOBILE TERMINAL

CROSS-REFERENCE TO RELATED APPLICATION

The present application is a continuation application of an U.S. application Ser. No. 15/498,073, filed on Apr. 26, 2017, which is a continuation application of an U.S. application Ser. No. 15/269,714, filed on Sep. 19, 2016, which is a continuation application of an U.S. application Ser. No. 14/849,332, filed on Sep. 9, 2015, which is a continuation application of an U.S. application Ser. No. 14/043,462, filed on Oct. 1, 2013, which is a continuation application of an U.S. application Ser. No. 13/218,365, filed on Aug. 25, 2011, which claims priority under 35 U.S.C. § 119 to Japanese Patent Application No. 2010-190840, filed on Aug. 27, 2010, entitled "MOBILE TERMINAL, LOCK RELEASE PROGRAM, AND METHOD OF LOCK RELEASE" and Japanese Patent Application No. 2010-240363, filed on Oct. 27, 2010, entitled "MOBILE TERMINAL, LOCK STATE CONTROL PROGRAM, AND METHOD OF CONTROLLING THE LOCK STATE", the content of all hereby expressly incorporated by reference in their entirety.

FIELD

The present invention relates to a mobile terminal, a lock release program, a method of releasing a lock, a lock control program, and a method of controlling a lock state, and particularly relates to a mobile terminal, a lock release program, a method of releasing a lock, a method of controlling a lock state, which can set a lock state.

BACKGROUND

Conventionally, mobile terminals in which a lock state can be set are widely known. An example of this type of device is disclosed. The television receiver according to the background of the art comprises a key lock function that can lock any operation keys by remote control. For example, once a locked key is operated, a lock release procedure OSD (On Screen Display) is displayed. Then, once a lock release operation is performed within a certain period of time, the key lock is released.

However, in the television receiver, for the case in which the method of releasing a lock is displayed in a specific language, it is possible that a user may not be able to understand the lock release procedure.

Therefore, the primary object of the present invention is to provide a novel mobile terminal, a lock release program, a method of releasing a lock, a lock control program, and a method of controlling a lock state.

SUMMARY

In a first embodiment, a mobile terminal includes a touch panel and an input detection part, a display part, a determination part, and an execution part. The input detection part is configured to detect inputs to the touch panel. The display part is configured to display an object corresponding to a lock state in which predetermined processing based on inputs detected by the input detection part is not executed. The determination part is configured to determine whether or not a predetermined input to the object is detected by the input detection part. The execution part is configured to release the lock state and execute predetermined processing if the determination part determines that a predetermined input to the object is detected.

In a second embodiment, a lock state control program for a mobile terminal including a touch panel, an input detection part configured to detect input to the touch panel, and a display part configured to display an object, being able to set a lock state in which predetermined processing based on the input detected by the input detection part is not executed, and display an object corresponding to the lock state on the display part, is functioned as a determination part and an execution part. The determination part is configured to determine whether or not a predetermined input for releasing the lock state is detected by the input detection part. The execution part is configured to release the lock state and execute predetermined processing in the case in which it is determined that a predetermined input for releasing the lock state is detected.

In a third embodiment, A method for controlling lock state of a mobile terminal including a touch panel, an input detection part configured to detect input to the touch panel, and a display part configured to display an object is that a lock state in which predetermined processing based on input detected by the input detection part is not executed is set, an object corresponding to the lock state on the display part is displayed, it is determined whether or not a predetermined input for releasing the lock state is detected by the input detection part, and the lock state is released and predetermined processing is executed in the case in which it is determined that a predetermined input for releasing the lock state is detected.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, an information device. Embodiments of the disclosure, however, are not limited to such mobile information devices, and the techniques described herein may also be utilized in other applications. For example, embodiments may be applicable to mobile phones, digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

First Example

Figure 1:
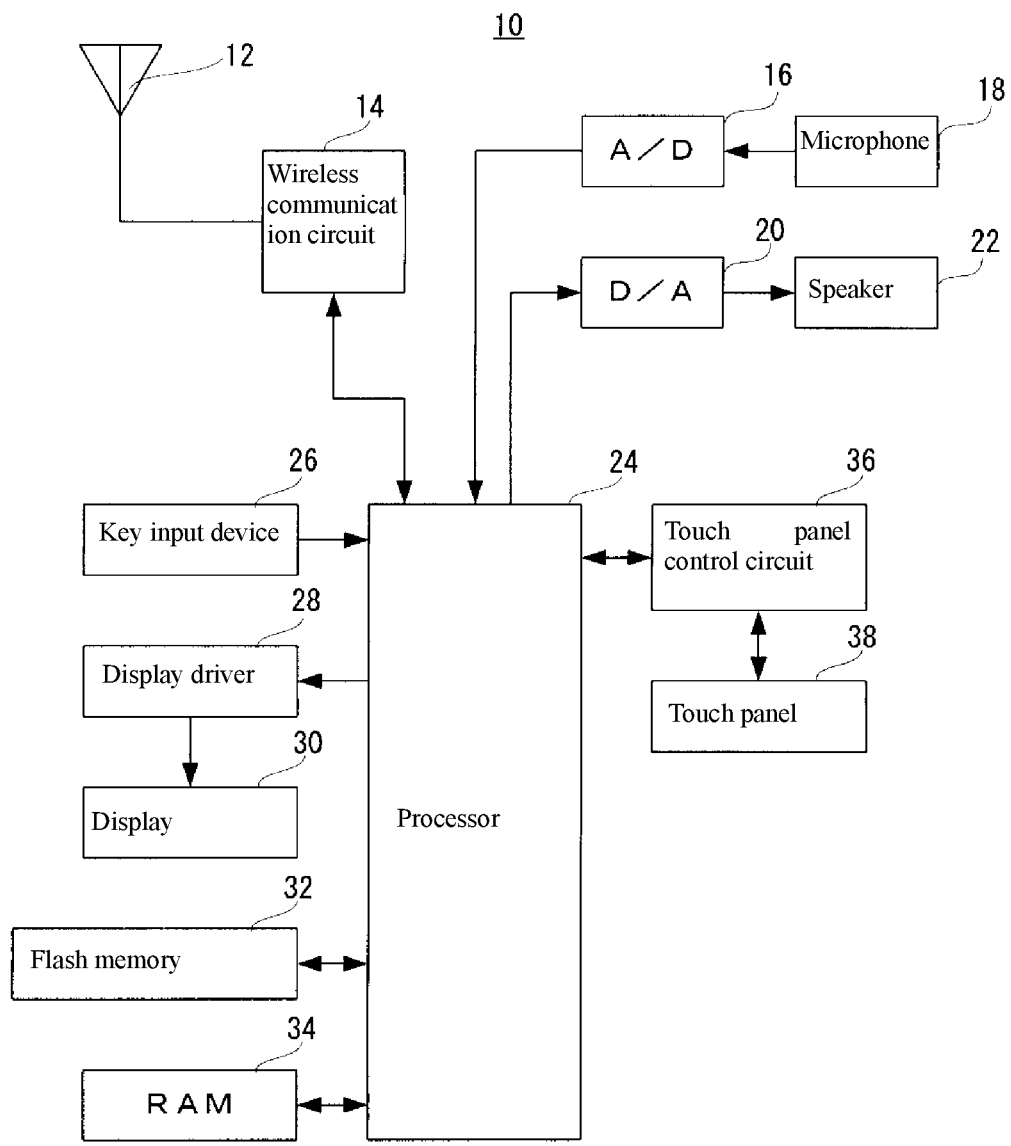
FIG. 1 is a diagram illustrating the electrical constitution of the mobile phone according to one example of this invention.

As shown in FIG. 1, a mobile phone 10 in this example is a type of mobile terminal. The mobile phone 10 comprises a processor 24 referred to as a CPU or a computer. A wireless communication circuit 14, an A/D 16, a D/A 20, a key input device 26, a display driver 28, a flash memory 32, a RAM 34 and a touch panel control circuit 36 are connected to this processor 24. An antenna 12 is connected to the wireless communication circuit 14. A microphone 18 is connected to the A/D 16. A speaker 22 is connected to the D/A 20 via an amplifier (not shown). A display 30 is connected to the display driver 28. A touch panel 38 is connected to the touch panel control circuit 36.

The processor 24 is a control IC, and manages the overall control of the mobile phone 10. The RAM 34 is used as a working area (comprising a drawing region) or a buffer area of the processor 24. Content data such as characters, images, voices, sounds and videos of the mobile phone 10 is recorded in the flash memory 32.

The A/D 16 converts an analog voice signal of a voice or a sound, which is input through a microphone 18 connected to the A/D 16, into a digital voice signal. The D/A 20 converts (decodes) a digital voice signal into an analog voice signal and provides it to the speaker 22 via an amplifier. Consequently, a voice or a sound corresponding to the analog voice signal is output from the speaker 22.

Figure 2:
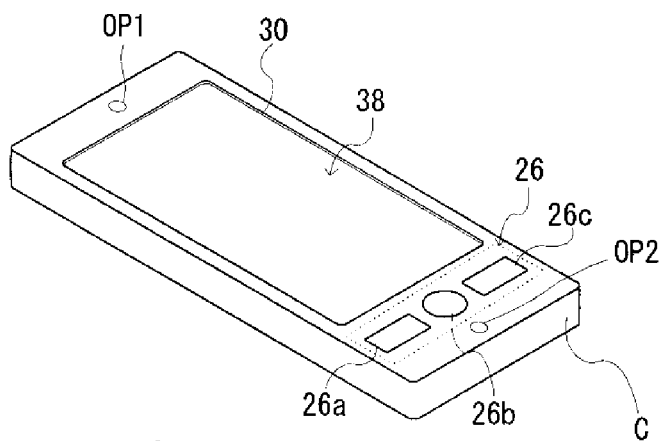
FIGS. 2(A) and 2(B) are diagrams illustrating the appearance of the mobile phone shown in FIG. 1.
Figure 2:
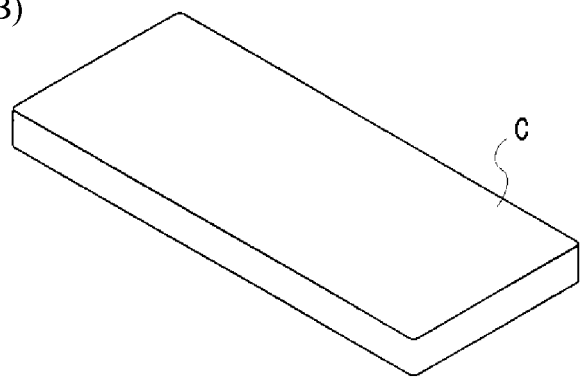

The key input device 26 comprises a call key 26a, a menu key 26b, and a call termination key 26c, which are shown in FIG. 2 (A). Information for the keys (key data) that is operated by a user is input into the processor 24. Once each key comprised in the key input device 26 is operated, a click sound is generated. The user can obtain operational feeling for the key operation by hearing the click sound.

Based on a command from the processor 24, the display driver 28 controls the display of the display 30 that is connected to the display driver 28. The display driver 28 also comprises a VRAM that temporarily stores image data to be displayed. Then, the processor 24 stores the image data that is to be displayed on the display 30 in this VRAM.

The touch panel 38 employs a capacitance system that detects changes in capacitance between electrodes caused by bringing a finger (contact member) near the surface of the touch panel. The touch panel 38, for example, detects that one or a plurality of fingers have contacted the touch panel 38. The touch panel 38 is a pointing device for indicating any points within the display 30. For example, once the touch panel 38 is operated by pressing, stroking, or touching the surface thereof with a finger, it detects such operations. Once a finger touches the touch panel 38, the touch panel control circuit 36, which functions as a contact detection part or a touch detection part, specifies the position of the finger and outputs coordinate data showing the operated position to the processor 24. That is, the user can input a direction of an operation, a figure, etc. into the mobile phone 10 by pressing, stroking, or touching the surface of the touch panel 38 with a finger.

Hereinafter, the operation in which a user touches the surface of the touch panel 38 with a finger is referred to as a "touch (contact)." On the other hand, the operation in which a finger is separated from the touch panel 38 is referred to as "separating" or a "release." The coordinates indicated by the touch are referred to as the "touch point (first position)," and the coordinates indicated by the release are referred to as the "release point (second position)." The operation of stroking the surface of the touch panel 38 or the operation of moving a finger relative to the touch panel 38 while maintaining contact is referred to as a "slide." The operation in which a user touches the surface of the touch panel 38 and releases it sequentially is referred to as "touch and release." The operation of sliding a finger on the surface of the touch panel 38 for a predetermined distance (for example, 50 [pixels]) within a predetermined period of time (for example, 50 [ms]) while maintaining the touch and then releasing the finger therefrom is referred to as a "flick." These operations, such as touch, release, slide, flick, as well as touch and release, performed on the touch panel 38 are collectively referred to as "touch operations (contact operations)."

The contact member may comprise not only fingers but also conductors. The touch operation may be performed using a touch pen, etc. having a conductor attached at its tip. A detection system for the touch panel 38 may employ a surface-capacitance system or may be a resistance film system, an ultrasonic system, an infrared ray system, an electromagnetic induction system, etc.

The wireless communication circuit 14 is a circuit for performing wireless communication in a CDMA system. For example, once a user instructs the key input device 26 to perform phone calling, based on a command from the processor 24, the wireless communication circuit 14 executes outgoing phone call processing and outputs an outgoing phone call signal via the antenna 12. The outgoing phone call signal is transmitted to the phone of another party via a base station and a communication network (not shown). Once incoming call processing is executed at the phone of the other party, a communicable state is established and the processor 24 executes call processing.

Normal call processing is described in detail below. The modulated voice signal transmitted from the phone of the other party is received by the antenna 12. Demodulation processing and decoding processing are applied to the received modulated voice signal by the wireless communication circuit 14. The received voice signal obtained by this processing is converted into an analog voice signal by the D/A 20 and then output from the speaker 22. On the other hand, a transmitted voice signal that is captured through the microphone 18 is converted into a digital voice signal by the A/D 16 and subsequently provided to the processor 24. Based on a command from the processor 24, coding processing and modulation processing by the wireless communication circuit 14 are applied to the transmitted voice signal that is converted into a digital voice signal, and the signal is output via the antenna 12. Consequently, the modulated voice signal is transmitted to the phone of the other party via a station and a communication network.

Once a call request signal from the phone of the other party is received by the antenna 12, the wireless communication circuit 14 notifies the processor 24 of an incoming phone call (also referred to as call reception). In response, the processor 24 controls the display driver 28 to display information on the source of the call (phone number) on the display 30. At more or less the same time, the processor 24 causes an incoming call tone (also referred to as an incoming call melody or an incoming call voice) to be output from the speaker (not shown). The processor 24 causes the mobile phone 10 to vibrate or LEDs (not shown) to illuminate in order to notify the user of the incoming phone call.

Once the user performs a response operation using the call key 26a, based on a command from the processor 24, the wireless communication circuit 14 executes incoming phone call processing, thus establishing a communicable state, and the processor 24 executes the abovementioned normal call processing.

Once a call termination operation is performed by the call termination key 26c after shifting to the communicable state, the processor 24 causes the wireless communication circuit 14 to transmit a call termination signal to the phone of the other party. After transmitting the call termination signal, the processor 24 terminates call processing. When the call termination signal is received from the phone of the other party in advance, the processor 24 also terminates call processing. Additionally, when the call termination signal is received from a mobile network without depending on the phone of the other party, the processor 24 also terminates call processing.

The mobile phone 10 comprises a manner mode function that arbitrarily switches between a manner mode (a specific mode) that restricts the volume of an incoming call tone output from the speaker and a normal mode that does not restrict the volume of an incoming call tone. Both the manner mode and the normal mode are set on the mobile phone 10, so the user can arbitrarily switch between these two modes. Consequently, the user can selectively use the manner mode or the normal mode depending on the scene, place, etc., at which the mobile phone 10 is utilized.

FIG. 2 (A) is an external view illustrating the appearance of the front surface of the mobile phone 10. FIG. 2 (B) is an external view illustrating the appearance of the rear surface of the mobile phone 10. As shown in FIG. 2 (A), the mobile phone 10 is formed in a straight shape, and comprises a plain rectangular housing C. The microphone 18 (not shown) is embedded in the housing C. An opening OP2 leading to the embedded microphone 18 is longitudinally comprised on one front surface of the housing C. The speaker 22 is embedded in the housing C and an opening OP1 leading to the embedded speaker 22 is longitudinally comprised on the other front surface of the housing C. The display 30 is attached so as to be viewed from the front surface side of the housing C. The touch panel 38 is comprised on the display 30.

A variety of keys that are comprised in the key input device 26 comprise a call key 26a, a menu key 26b, and a call termination key 26c. These keys are comprised on the front surface of the housing C.

As an example, the user enters a phone number by performing a touch operation on the dial keys displayed on the display 30 and then performs an outgoing phone call operation using the call key 26a. Once a call is terminated, the user performs a call termination operation using the call termination key 26c. Additionally, the user selects and decides the menu by performing a touch operation on soft keys and a menu that are displayed on the display 30. The user turns on and off the power source of the mobile phone 10 by long-pressing the call termination key 26c.

However, in FIG. 2 (A), (B), because the antenna 12, the wireless communication circuit 14, the A/D 16, the D/A 20, the processor 24, the display driver 28, the flash memory 32, the RAM 34, and the touch panel control circuit 36 are embedded in the housing C, they are not shown in FIG. 2 (A), (B).

The mobile phone 10 comprises a lock function that prevents predetermined functions such as outgoing phone calls or e-mail transmission and reception, which are available in the mobile phone 10, from being executed. For example, once the call termination key 26c is operated, the power supply for the display 30 and the touch panel 38 are turned off while set to the lock state, thus disabling the touch operation for executing a phone function, etc. Additionally, once the power supply for the display 30 is turned on in the state in which the lock state is set, the power supply for the touch panel 38 is turned on simultaneously, thus allowing touch operations to be detected. Then, once a touch operation described below is performed, the lock state is released.

Figure 3:
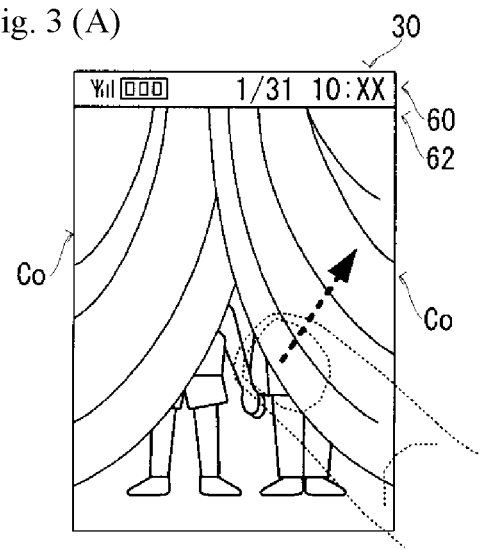
FIGS. 3(A), 3(B), and 3(C) are diagrams illustrating one example of the procedure for releasing the lock state set by the mobile phone shown in FIG. 1.
Figure 3:
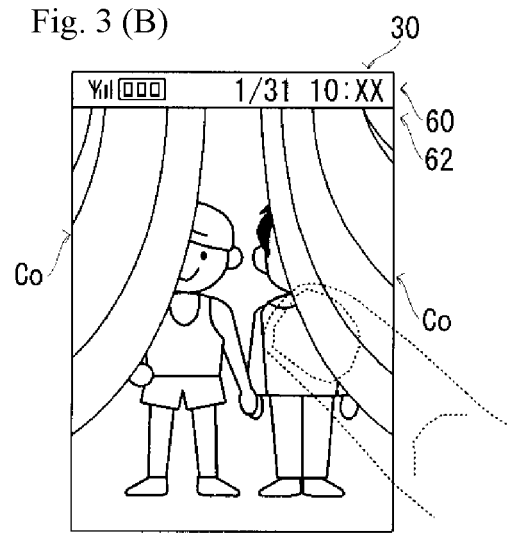
Figure 3:
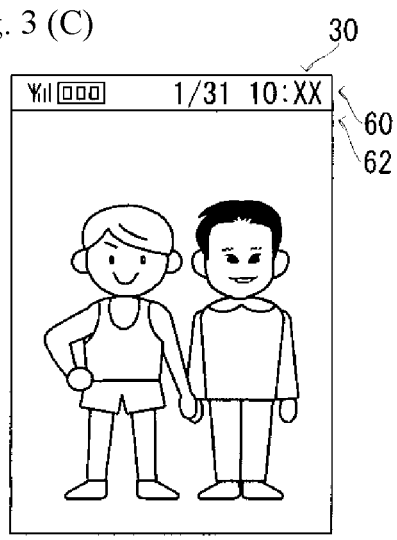

As shown in FIG. 3 (A), when the menu key 26b is operated in the state in which the lock state is set, the power supply for the display 30 is turned on and a lock screen is displayed. The display area of the display 30 comprises a status display area 60 and a function display area 62. An icon indicating a radio wave reception state with the antenna 12

(also referred to as a PICT), an icon indicating the remaining battery capacity of a secondary battery, as well as the current time and date are displayed on the status display area 60. The current time displayed on the status display area 60 is based on time information output from RTC (Real Time Clock) (not shown).

On the other hand, the lock screen displayed on the function display area 62 comprises a stand-by image indicating that it is in a stand-by state and a curtain object Co that covers a stand-by image and induces the user to perform a slide. Once sliding upwards from one position (specific direction), the background image that was hidden by the curtain object Co begins to be displayed gradually as shown in FIG. 3 (B).

For the case in which the slide direction when a finger is moved from the position first touched (contacted) by the finger, the direction is determined from the position at which the touch is currently performed on the touch panel 38 (touch position) and a touch point. Specifically, the slide direction is determined by whether or not the current y-coordinate of the touch position is in the upper side relative to the y-coordinate of the touch point. For example, for the case in which the origin of the coordinate system of the touch panel 38 is in the lower left in FIG. 3 (A), when the y-coordinate of the touch point is 30 and the y-coordinate of the touch position is 70, the slide direction is determined as upwards because the difference between these two y-coordinates is "+40 (=70−30)." On the other hand, for the case in which the y-coordinate of the touch point is 70 and the y-coordinate of the touch position is 20, the slide direction is determined as downwards because the difference is "−50 (=20−70)." That is, if the difference between the two y-coordinates is "+(difference >0)," it is determined as upwards, whereas if it is "−(difference <0)," it is determined as downwards. However, in this example, if the difference between two y-coordinates is "0," it is determined as upwards. For the case in which the origin of the coordinate system of the touch panel 38 is in the upper left, the conditions for determining upwards and downwards will be reversed.

Once the slide distance becomes equal to or greater than a predetermined distance (predetermined value), the curtain object Co is not displayed on the display 30, thereby releasing the lock state as shown in FIG. 3 (C). For the case in which the operation for releasing the lock state is interrupted, the curtain object Co is returned to the initial display.

In this way, because the lock state is not released as long as the user slides in a specific direction by equal to or greater than a predetermined distance, releasing the lock state by mistaken operations can be reduced. Because the display of the curtain object Co changes in response to the slide distance, the user can see that the operation for releasing the lock state is performed correctly as well as the amount of touch operation (the amount of the slide) required for releasing the lock state. The mobile phone 10 can cause a display of the display 30 to return to the last state if the operation for releasing the lock state is incorrect.

The background image shown in FIG. 3 (A) to FIG. 3(C) may be set in advance by a user, or may be an image that is specified by the manufacturer which developed the mobile phone 10.

In this example, touch is disabled by turning off the power supply for the touch panel control circuit 36 and the power supply of the touch panel 38. As a result, the electric power consumption of the mobile phone 10 is more conserved. In another example, touch may be disabled by executing processing in which the processor 24 ignores the touch coordinate that is input, without turning off the power supply for the touch panel control circuit 36 and the power supply of the touch panel 38.

Figure 4:
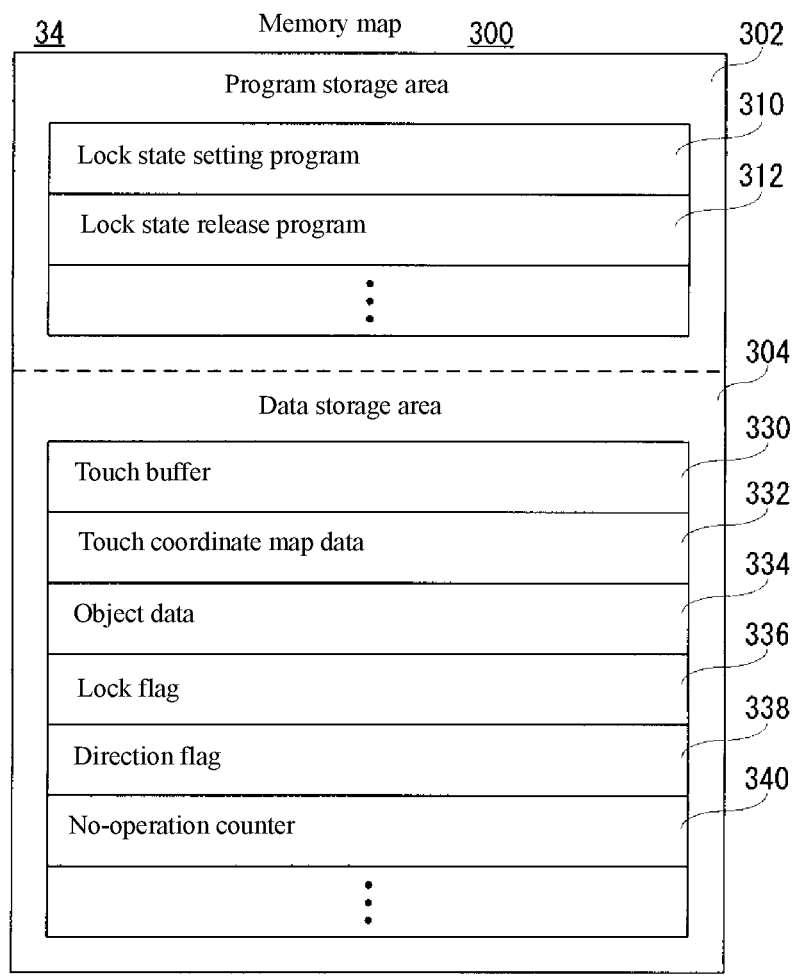
FIG. 4 is a diagram illustrating one example of a memory map of the RAM shown in FIG. 1.

FIG. 4 is a diagram illustrating a memory map 300 of the RAM 34. The memory map 300 of the RAM 34 comprises a program storage area 302 and a data storage area 304. A part of a program and data is read out from the flash memory 32 entirely at one time or partially and sequentially as desired, stored in the RAM 34, and then processed by the processor 24.

A program for operating the mobile phone 10 is stored in the program storage area 302. For example, the program for operating the mobile phone 10 may comprise a lock state setting program 310, a lock state release program 312, etc. The lock state setting program 310 is a program for setting a lock state in the mobile phone 10. The lock state release program 312 is a program for releasing the lock state set in the mobile phone 10.

The program for operating the mobile phone 10 comprises a program for notifying of an incoming phone call state, a program for establishing a call state, etc.

The data storage area 304 comprises a touch buffer 330, etc. and stores touch coordinate map data 332, object data 334, etc. The data storage area 304 also comprises a lock flag 336, a direction flag 338, a no-operation counter 340, etc.

The touch buffer 330 temporarily stores coordinates indicating a touch point, a release point, and a current touch position, which are output from the touch panel control circuit 36.

The touch coordinate map data 332 is data for associating a touch coordinate in the touch operation with a displayed coordinate of the display 30. That is, the processor 24 associates the result of the touch operation that was performed on the touch panel 38 with a display of the display 30, based on the touch coordinate map data 332. The object data 334 is image data of the curtain object Co displayed on the display 30.

The lock flag 336 is a flag for determining whether or not the lock state is set. For example, the lock flag 336 comprises a 1-bit register. Once the lock flag 336 is set to ON (established), a data value "1" is set to the register. On the other hand, once the lock flag 336 is set to OFF (not established), a data value "0" is set to the register.

The direction flag 338 is a flag for indicating the results of determination of the slide direction. For example, if the slide direction is determined as upwards, the flag is set to ON, and if it is determined as downwards, the flag is set to OFF.

The no-operation counter 340 is a counter for measuring a certain period of time (for example, 60 seconds), which starts counting once initialized. The no-operation counter 340 is also referred to as a no-operation timer, and, once the no-operation timer is executed, the no-operation counter 340 is initialized and starts counting. Additionally, the no-operation timer is initialized each time when a key operation or a touch operation is performed.

Although not shown in the drawings, the data storage area 304 stores a buffer for temporarily storing data output from a RCT, image data for displaying a GUI, etc., and comprises counters and flags required for operating the mobile phone 10.

Figure 5:
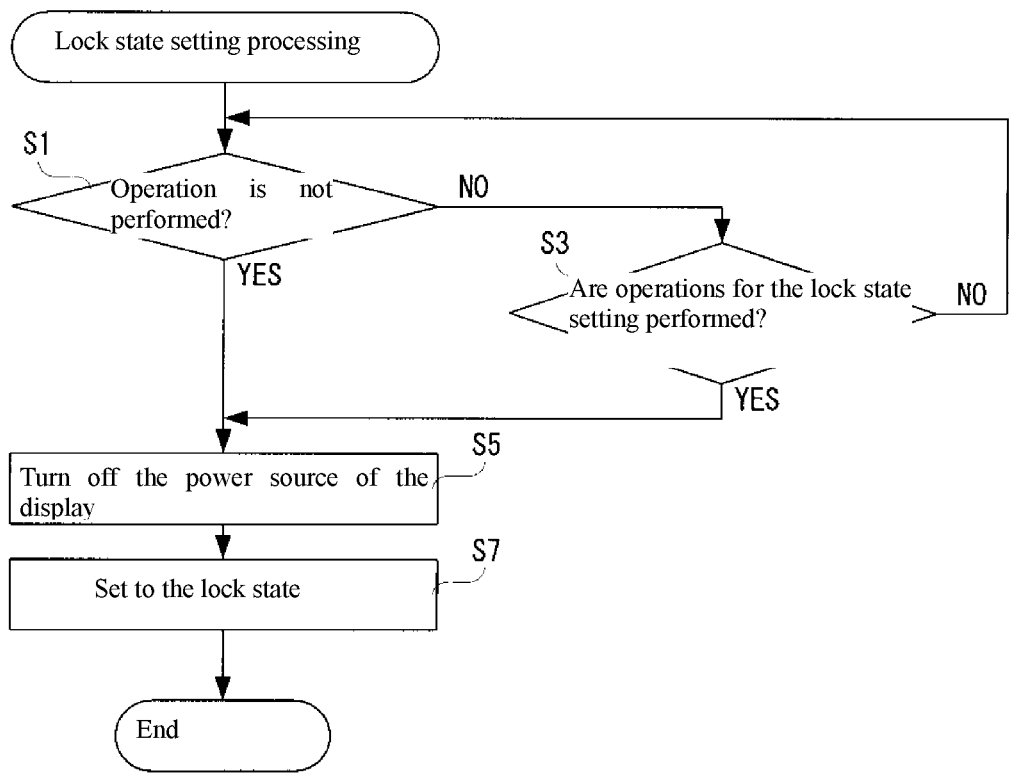
FIG. 5 is a flow diagram illustrating the lock state setting processing of the processor shown in FIG. 1.
Figure 6:
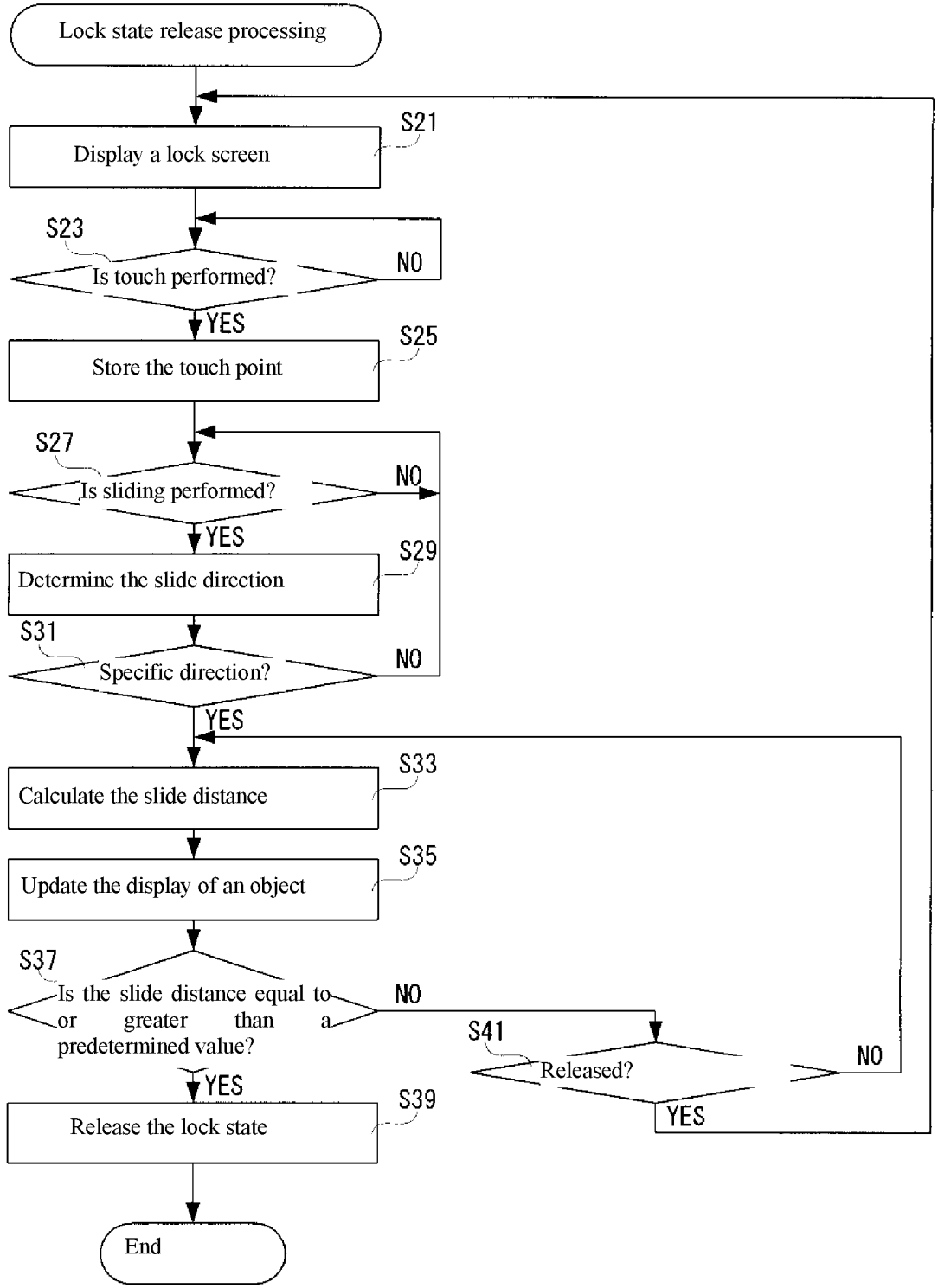
FIG. 6 is a flow diagram illustrating the lock state release processing of the processor shown in FIG. 1.

The processor 24 processes a plurality of tasks in parallel comprising the lock state setting processing shown in FIG. 5, the lock state release processing shown in FIG. 6, etc., under the control of a Linux (registered trademark) based OS such as Android (registered trademark) and REX or other OSs.

FIG. 5 is a flow diagram of the lock state setting processing. For example, once the power supply for the mobile phone 10 is turned on, in step S1, the processor 24 determines whether or not any operation is performed. That is, the processor 24 determines whether or not the no-operation timer has expired because the touch operation and the key operation have not been performed for a certain period of time. If it is "YES" in step S1, for example, if the touch operation and the key operation are not performed for 60 seconds, then the processor 24 proceeds to step S5. On the other hand, if it is "NO" in step S1, that is, if the no-operation timer has not expired, then, in step S3, the processor 24 determines whether or not the operation for setting the lock state is performed. For example, the processor 24 determines whether or not the call termination key 26c is operated. If it is "NO" in step S3, that is, if the operation for setting the lock state is not performed, then the processor 24 returns to step S1.

On the other hand, if it is "YES" in step S3, that is, if the operation for setting the lock state is performed, then, in step S5, the processor 24 turns off the power supply for the display 30. That is, the processor 24 issues the command for turning off the power supply for the display 30 to a power supply circuit. Then, in step S7, the processor 24 sets the lock state and terminates the lock state setting processing. That is, in step S7, the processor 24 sets the lock flag 336 to OFF.

In another example, the power supply for the display 30 may be turned off after setting the lock state. In this case, in the lock state setting processing in FIG. 5, the order of step S5 and step S7 is reversed. That is, in this other example, the processing in step S5 is executed after executing the processing of step S7.

FIG. 6 is a flow diagram of the lock state release processing. For example, once the menu key 26b is operated while the lock state is set, in step S21, the processor 24 displays a lock screen. That is, the processor 24 displays the lock screen shown in FIG. 3 (A) on the display 30 after supplying the command for turning on the power supply for the display 30. The processor 24 executing the processing of step S21 functions as a display part.

Then, in step S23, the processor 24 determines whether or not a touch has been performed. That is, the processor determines whether or not a touch is detected by the touch panel control circuit 36. If it is "NO" in step S23, that is, if a touch is not detected, then the processor 24 repeatedly executes step S23. If it is "YES" in step S23, that is, if a touch is detected, then, in step S25, the processor 24 stores a touch point. That is, the touch point that is detected by the touch panel control circuit 36 is stored in the touch buffer 330.

In step S27, the processor 24 determines whether or not sliding has been performed. That is, in the state in which a touch is detected by the touch panel control circuit 36, it is determined whether or not the coordinates of the touch position are different from those of the touch point. If it is "Yes" in step S27, that is, if sliding is performed on the touch panel 38, then the processor 24 repeats the processing of step S27. If it is "NO" in step S27, that is, if sliding is performed on the touch panel 38, then, in step S29, the processor 24 determines the slide direction. That is, the processor 24 determines the slide direction based on the y-coordinates of the touch point and the touch position. ON and OFF of the direction flag 338 are also set based on the results of determination. The processor 24 executing the processing of step S29 functions as a determination part.

In step S31, the processor 24 determines whether or not it is a specific direction. That is, the processor 24 determines whether or not the slide direction is determined as upwards and whether or not the direction flag 338 is set to ON. If it is "NO" in step S31, that is, if the direction flag 338 is set to OFF (the slide direction is downwards), then the processor 24 returns to step S27. If it is "YES" in step S31, that is, if the direction flag 338 is set to ON (the slide direction is upwards), then, in step S33, the processor 24 calculates the slide distance. That is, the processor 24 calculates the distance, at which a contact member has moved from the first contact position (slide distance), from the touch position and the touch point utilizing the Pythagorean theorem. The processor 24 executing the processing of step S33 functions as a calculation part.

In step S35, the processor 24 updates the display of the object. That is, the processor 24 changes the display of the curtain object Co shown in FIG. 3 (A) in response to the distance of the calculated slide. The processor 24 executing the processing of step S37 functions as an update part.

In step 37, the processor 24 determines whether or not the distance of a slide is equal to or greater than a predetermined value. That is, the processor 24 determines whether or not the distance of the calculated slide is equal to or greater than a sufficient distance (predetermined value) to release the lock state. If it is "YES" in step S37, that is, if the slide distance is a sufficient distance to release the lock state, then, in step S39, the processor 24 releases the lock state and terminates the lock state release processing. That is, the processor 24 sets the lock flag 336 to OFF. The processor 24 executing the processing of step S39 functions as a release part.

If it is "NO" in step S37, that is, if the slide distance is not a sufficient distance to release the lock state, then, in step S41, the processor 24 determines whether or not release is performed. That is, the processor 24 determines whether or not a release is detected by the touch panel control circuit 36. If it is "NO" in step S41, that is, if a release is not detected, then the processor 24 returns to step S33. If it is "YES" in step S41, that is, if a release is detected, then the processor 24 returns to step S21.

In the lock state release processing shown in the FIG. 6, the processings of steps S29 to S31 and steps S37, S41 may be omitted. In this case, if sliding is performed until the display of an object is erased regardless of the direction and the slide distance, the lock state is released.

In the abovementioned lock state release processing, only the processing of step S37 and step S41 may be omitted. In this case, if sliding is performed in a specific direction regardless of the slide distance, the lock state is released.

In the processing of step S33, the slide distance can be calculated from a touch point and a release point. That is, for the case in which a sliding is performed quickly, the direction and the slide distance are ascertained from the touch point and the release point. On the other hand, for the case in which sliding is performed slowly, the direction and distance of the slide are ascertained from the touch point and the current touch position. Therefore, the abovementioned second position comprises not only a release point but also a current touch position.

In another example, whether or not the release is performed may be determined after the processing of step S37. For the case in which the abovementioned determination is made, if it is "YES," for example, if a finger is separated, then, in step S39, the lock state is released. On the other hand, if it is "NO," for example, if a finger is not separated, then the abovementioned determination is repeated until the finger is separated. By processing in this way, the release of the lock state due to mistaken operations can be reduced.

In the first example, using the curtain object Co can induce the user to slide. That is, the mobile phone 10 can induce the user to slide by using non-linguistic information. Therefore, the mobile phone 10 can cause the lock state to be released without depending on the language used by a user.

In the first example, the touch point in the operation for releasing the lock state does not depend on the display position of the curtain object Co. Therefore, a user may start sliding from any position regardless of the display position of the curtain object Co, as long as it is a position at which sliding can be performed upwards.

Second Example

In the second example, instead of the curtain object Co, a door object Do induces a user to slide. Because the mobile phone 10 according to the second example is the same as the first example, the duplicated description for the electrical constitution and the appearance of the mobile phone 10, the memory map of the RAM 34, the flow diagram, etc., will be omitted.

Figure 7:
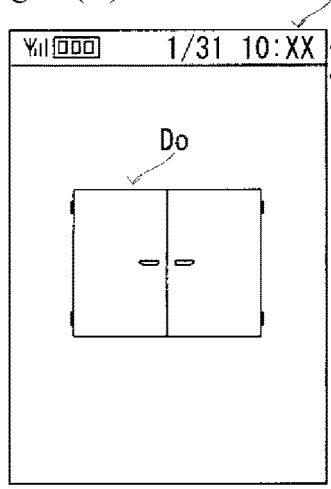
FIGS. 7(A), 7(B), and 7(C) are diagrams illustrating another example of the procedure for releasing the lock state set by the mobile phone shown in FIG. 1.
Figure 7:
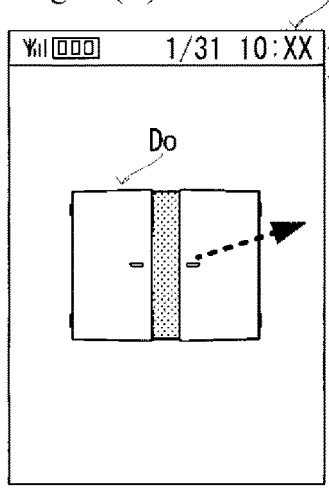
Figure 7:
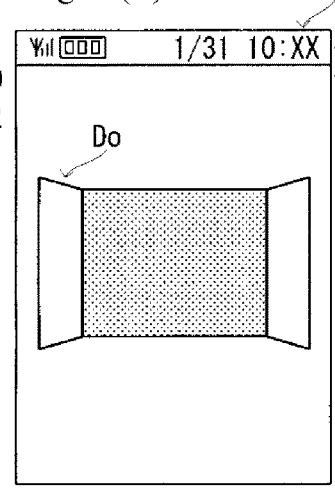

As shown in FIGS. 7 (A) to 7(C), once the menu key 26b is operated while the lock state is set, the door object Do is displayed on the display 30 as shown in FIG. 7 (A). Once sliding is performed upwards while displaying the door object Do as shown in FIG. 7 (A), the door object Do begins to be opened in response to the slide distance as shown in FIG. 7 (B). Once the slide distance becomes equal to or greater than a predetermined value, the door object Do enters the state shown in FIG. 7 (C), and the lock state is released. Then, once a certain period of time (for example, 1 second) elapses, the door object Do is erased and a stand-by image is displayed as shown in FIG. 3 (C).

When described with reference to the lock release processing shown in FIG. 6, once the processing of step S21 is executed, the display on the display 30 enters the state shown in FIG. 7 (A). Once the processing of step S35 is executed, the display on the display 30 enters the state shown in FIG. 7 (B) or FIG. 7 (C). Because the processing of step S39 is executed when the display of the display 30 enters the state shown in FIG. 7 (C), the lock state is released.

Although the door is a double door in FIGS. 7 (A) to (C), it may be a single door, a sliding door, etc. Additionally, it may more clearly indicate that the lock state is released, by showing a key inserted into a key hole and then a door being opened.

Third Example

In the third example, instead of the curtain object Co or the door object Do, a flower object Fo induces a user to slide. Because the mobile phone 10 according to the third example is the same as the first example, the duplicated description for the electrical constitution and the appearance of the mobile phone 10, the memory map of the RAM 34, the flow diagram, etc., will be omitted.

Figure 8:
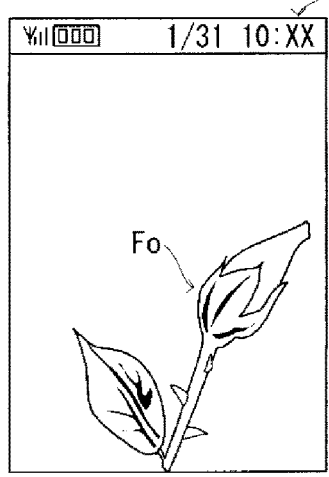
FIGS. 8(A), 8(B), and 8(C) are diagrams illustrating another example of the procedure for releasing the lock state set by the mobile phone shown in FIG. 1.
Figure 8:
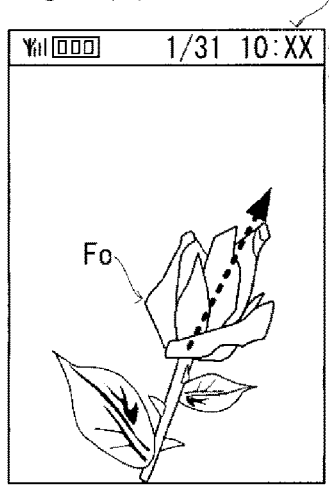
Figure 8:
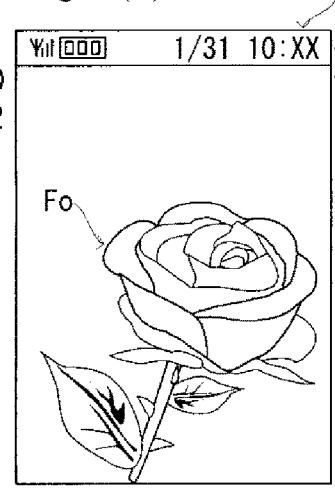

As shown in FIGS. 8 (A) to (C), once the menu key 26b is operated while the lock state is set, the flower object Fo is displayed on the display 30 as shown in FIG. 8 (A). Once sliding is performed upwards while displaying the flower object Fo, the flower object Fo begins to be opened in response to the slide distance as shown in FIG. 8 (B). Once the slide distance becomes equal to or greater than a pre-determined value, the flower object Fo fully comes into bloom as shown in FIG. 8 (C), and the lock state is released. In the same manner as the second example, once a certain period of time elapses, the flower object Fo is erased and a stand-by image is displayed as shown in FIG. 3 (C).

When the third example is described with reference to the lock release processing shown in FIG. 6, once the processing of step S21 is executed, the display on the display 30 enters the state shown in FIG. 8 (A). Once the processing of step S35 is executed, the display on the display 30 enters the state shown in FIG. 8 (B) or FIG. 8 (C). Because the processing of step S39 is executed when the display of the display 30 enters the state shown in FIG. 8 (C), the lock state is released.

Of course, although the flower object Fo is shown by a rosaceous flower in FIGS. 8 (A) to (C), it may be shown by other types of flowers. The flower shown by the flower object Fo may not be single but a plurality of flowers. In this case, all flowers come into bloom simultaneously when the operation for releasing the lock state is performed.

In this way, as can be seen from the second example and the third example, a variety of objects can be utilized to induce a user to perform a slide.

As can be seen from the abovementioned description, the mobile phone 10 comprises the touch panel 38 on which touch operations such as touch, release, slide, etc., are performed, and can set the lock state that disables the touch operations for executing a phone function, etc. For example, once the menu key 26c is operated while the lock state is set, the curtain object Co, the door object Do, or the flower object Fo, which induce sliding for releasing the lock state, is displayed on the display 30. Once sliding is performed, the processor 24 calculates the distance and the slide direction from the coordinates of the touch point and the current touch position. Once sliding is performed upwards by a predetermined distance, the lock state is released.

In this way, the mobile 10 can cause the lock state to be released regardless of the language utilized by a user by displaying an object that induces the operation for releasing the lock state.

The objects shown in the first example to the third example may be arbitrarily selected by a user.

The operation for releasing the lock state may be more strongly induced by providing visual effects such as blinking to the curtain object Co, the door object Do, and the flower object Fo which are displayed on the display 30.

In another example, a predetermined distance for releasing the lock state may be displayed with the object.

The specific direction is not limited to upwards and may be downwards, leftwards, or rightwards.

In this example, the lock state may be set not only by inputting an operation to the call termination key 26c but also a predetermined operation. For example, in another example, the lock state may be set by pressing down a predetermined key on the key input device 26 a predetermined number of times. Although it is also similar with respect to the abovementioned call termination key 26c, because the lock state can be set immediately at a desired timing of a user without maintaining a no-operation state for a predetermined period of time, the convenience for the user is improved.

Although the communication mode of the mobile phone 10 is a CDMA system, it may employ a LTE (Long Term Evolution) system, a W-CDMA system, a GSM system, a TDMA system, a PHS system, etc.

The lock state setting program 310 and the lock state release program 312 may be stored in a HDD for data distribution and delivered to the mobile phone 10 via a network. Storage media such as optical disks including CDs, DVDs, and BDs (Blu-ray Disc), USB memory, memory cards, etc. may be sold or distributed in the state in which these programs are stored in these storage media. For the case in which the lock state setting program 310 and the lock state release program 312 which are downloaded through the abovementioned server and a storage medium are installed in a mobile phone with a similar configuration as that of the present example, similar effects are obtained.

Additionally, the present example may be applied not only to a mobile phone 10 but also a smart phone, a PDA (Personal Digital Assistant), etc.

Any specific numerical values, such as a certain period of time, listed herein is a mere example and appropriately changeable according to the needs of product specifications.

Fourth Example

The mobile phone 10 can be set to a lock state that prevents predetermined processing based on a touch operation to the touch panel 38 from being executed. For example, once the call termination key 26c is operated, the power supply for the display 30 is turned off and the lock state is set, thereby disabling touch operations to the touch panel 38. In the state in which the lock state is set, once an operation is performed by a specific procedure, the lock state is released.

In this example, touch operation is disabled by turning off the power supply for the touch panel control circuit 36 and the power supply of the touch panel 38. However, in another example, the touch operation may be disabled by executing processing in which the processor 24 ignores the touch coordinate that is input without turning off the power supply for the touch panel control circuit 36 and the power supply of the touch panel 38.

Figure 9:
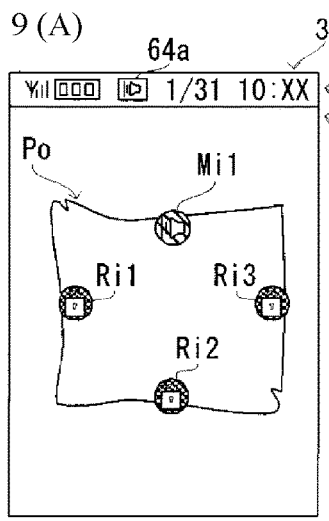
FIGS. 9(A), 9(B), 9(C), 9(D), and 9(E) are diagrams illustrating one example of the procedure for releasing the lock state that by the mobile phone shown in FIG. 1.
Figure 9:
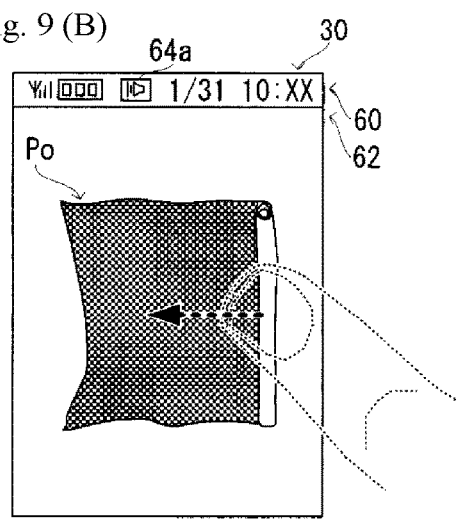
Figure 9:
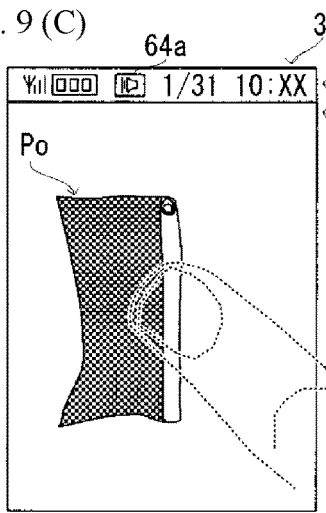
Figure 9:
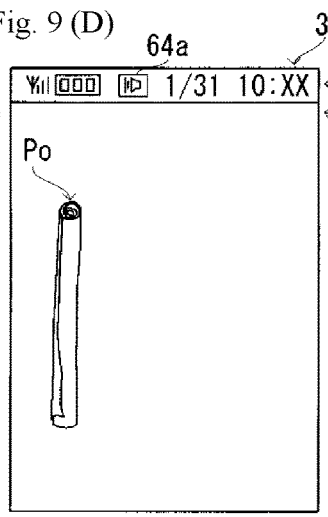
Figure 9:
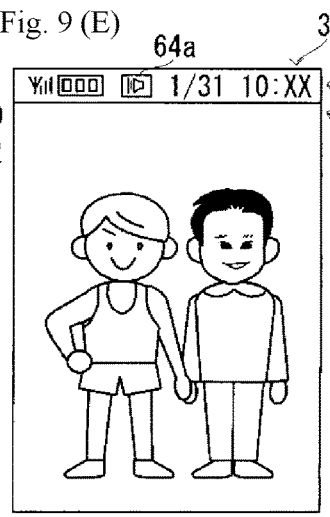

A procedure for releasing the lock state is described below with reference to FIG. 9 (A) to FIG. 9 (E). As shown in FIG. 9 (A), once the menu key 26b is operated in the state in which the lock state is set, the power supply for the display 30 is turned on and a lock screen is displayed. The display area of the display 30 comprises a status display area 60 and a function display area 62. An icon indicating a radio wave reception state with the antenna 12 (also referred to as a PICT), an icon indicating the remaining battery capacity of a secondary battery, as well as the current time and date are displayed on the status display area 60. The current time displayed on the status display area 60 is based on time information that is output from RTC (Real Time Clock) (not shown).

Figure 10:
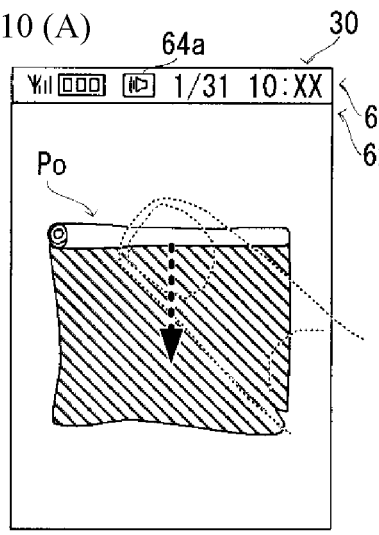
FIGS. 10(A), 10(B), 10(C), and 10(D) are diagrams illustrating one example of the procedure for switching between the available manner mode and normal mode which are set in the mobile phone shown in FIG. 1.
Figure 10:
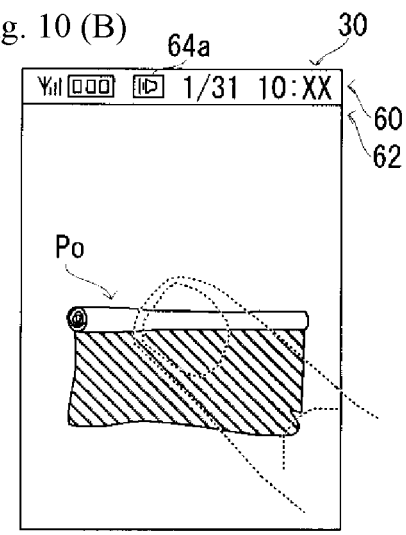
Figure 10:
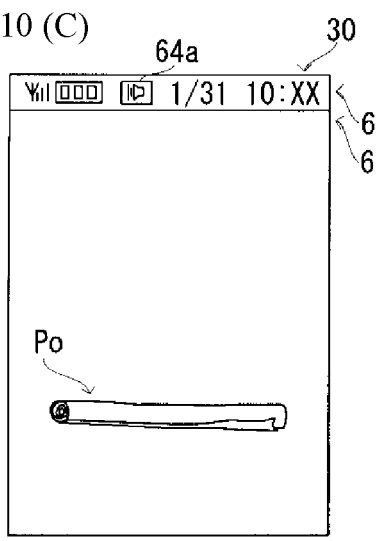
Figure 10:
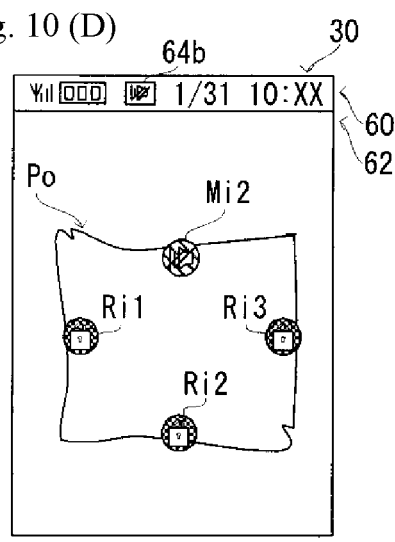

A manner PICT 64a or a manner PICT 64b (see FIG. 10 (D)) corresponding to the manner mode function is displayed on the status display area 60. For the case in which the manner PICT 64a is displayed on the status display area 60, it indicates to a user that it is in normal mode. For the case in which the manner PICT 64b is displayed on the status display area 60, it indicates to the user that it is in manner mode.

A lock screen that is displayed on the function display area 62 comprises a white paper object (graphic) Po, green rock icons (first icons) Ri1, Ri2, Ri3, and a red manner icon (second icon) Mi1. The paper object Po is generally quadrilateral, and each icon is displayed on the region (specific region) associated with the paper object Po. Specifically, the manner icon Mi1 is displayed on the upper side of the paper object Po. The rock icon Ri1 is displayed on the left side of the paper object Po, the rock icon Ri2 is displayed on the lower side thereof, and the rock icon Ri3 is displayed on the right side thereof. The rock icons Ri1 to Ri3 are referred to as a rock icon Ri unless otherwise distinguished.

Once a user touches one of the rock icons Ri and slides toward the inside of the paper object Po, the lock state can be released. A procedure to release the lock state is specifically described below.

As shown in FIG. 9 (B), for example, once the rock icon Ri3 is touched, the three rock icons Ri and the manner icon Mi1 are erased and the right side of the paper object Po corresponding to the touched rock icon Ri3 forms a curled shape. The color of the paper object Po is changed to the same color as the touched rock icon Ri3, that is, to green. Consequently, the user can identify the icon that he himself touched by viewing the changed color of the paper object Po.

Once sliding is performed toward the inside (left side in this case) of the paper object Po while the touch panel 38 is touched, the display of the paper object Po is changed as if it were wound gradually as shown in FIG. 9 (C). That is, because the shape of the paper object Po is changed in response to the slide distance, the user can see whether or not the operation by the user himself is enabled.

As shown in FIG. 9 (D), once the slide distance becomes equal to or greater than a predetermined distance (predetermined value), the paper object Po is changed into a fully wound shape (predetermined shape). Once the paper object Po forms the fully wound shape, an animation in which the paper object Po flies off somewhere is displayed and the display of the paper object Po is erased. Then, once the display of the paper object Po is erased, the lock state is released, and a stand-by image indicating that it is in a stand-by state is displayed on the display 30 as shown in FIG. 9 (E).

In this way, the user can release the lock state only by sliding in the direction of winding of the paper object Po that seems to be a paper.

For the case in which the touch is separated before the slide distance reaches a predetermined distance, the shape of the paper object Po is initialized and returns to the state shown in FIG. 9 (A). Therefore, for the case in which the user makes a mistake in an operation for the switching of the manner mode (described blow) and the release of the lock state, the operation can be performed again from the beginning simply by separating the finger.

For the case in which the user does not slide in a specific direction, the shape of the paper object Po is initialized, too. Because "specific direction" means a direction towards the inside of the object from a touched icon, it may or may not be the same direction as the specific direction of other icons depending on the touched icon.

Specifically, the specific direction corresponding to the rock icon Ri1 is rightwards, the specific direction corresponding to the rock icon Ri2 is upwards, and the specific direction corresponding to the rock icon Ri3 is leftwards. The specific direction of the manner icon Mi (described below) is downwards.

The slide direction is determined from the position at which the touch is currently performed to the touch panel 38 (touch position: second position) and a touch point. For the case of the rock icon Ri1 and the rock icon Ri3, the direction is detected based on x-coordinates, and for the case of the rock icon Ri2 and the manner icon Mi1, it is detected based on y-coordinates.

For example, for the case in which the origin of the coordinate system of the touch panel 38 is in the lower left in FIG. 9 (A), when the y-coordinate of the touch point is 30 and the y-coordinate of the touch position is 70, the slide direction is detected as upwards because the difference between the two y-coordinates is "+40 (=70−30)." For the case in which the y-coordinate of the touch point is 200 and the y-coordinate of the touch position is 20, the slide direction is detected as downwards because the difference is "−180 (=20−200)." That is, if the difference between the two y-coordinates is "+(difference >0)," it is detected as upwards, whereas if it is "−(difference <0)," it is detected as downwards.

For the case in which the x-coordinate of the touch point is 100 and the x-coordinate of the touch position is 110, the slide direction is detected as rightwards because the difference between the two x-coordinates is "+10 (=110−100)." For the case in which the x-coordinate of the touch point is 140 and the x-coordinate of the touch position is 80, the slide direction is detected as leftwards because the difference is "−60 (=80−140)." That is, if the difference between the two x-coordinates is "+(difference >0)," it is detected as rightwards, whereas if it is "−(difference <0)," it is detected as leftwards. However, for the case in which the origin of the coordinates of the touch panel 38 is in the upper left, the condition of detecting upwards and downwards is reversed.

In this example, if the difference between y-coordinates or x-coordinates is "0," the slide operation itself is determined to be disabled.

In this way, in this example, the lock state can be released by determining the direction with only one of the horizontal axis or the vertical axis even if the slide direction is not an immediately beside direction shown in the FIG. 9 (B), etc. but an oblique direction.

Next, a user can release the lock state and switch between the manner mode and the normal mode by touching the manner icon Mi1 and sliding towards the inside of the paper object Po (downwards) while touching. Specifically, as shown in FIG. 10 (A), once the manner icon Mi1 corresponding to the normal mode is touched, the display of the manner icon Mi1 and the three rock icons Ri is erased. The upper side of the paper object Po corresponding to the manner icon Mi1 is formed to be a curled shape. The color of the paper object Po turns red, the same color as the manner icon Mi.

Then, as shown in FIG. 10 (B), once sliding in the specific direction, that is, downwards corresponding to the manner icon Mi, is performed while maintaining the touch, the shape of the paper object Po is wound gradually. Once the slide distance reaches a predetermined distance, the shape of the paper object Po enters a fully wound state as shown in FIG. 10 (C). Once the display of the paper object Po forming the fully wound shape is erased, it is switched from the normal mode to the manner mode and the lock screen shown in FIG. 10 (D) is displayed on the display 30. In the display shown in the FIG. 10 (D), the manner PICT 64b indicating that it is in the manner mode is displayed, and a manner icon Mi2 corresponding to the manner mode is displayed on the upper side of the paper object Po. Therefore, the user can release the lock state and arbitrarily switch between the normal mode and the manner mode by sliding equal to or greater than a predetermined distance. That is, if sliding equal to or greater than the predetermined distance is not performed, the lock state is not released and the mode is not switched.

In this way, in this example, displaying the paper object Po can induce the user to slide in the direction of winding the paper object Po. Accordingly, the slide direction can be limited without giving a sense of incongruity to the user. Furthermore, because the slide direction is limited, it reduces the chance of releasing the lock state by mistake.

The user can release only the lock state by performing the touch operation on the rock icon Ri and can also release the lock state and switch the mode by performing the touch operation on the manner icon Mi.

The lock state may be released and the mode switched when the slide distance reaches a predetermined distance without changing the shape of the paper object Po even if it is touched. In this case, the icons that are not touched (the manner icon Mi and the rock icons Ri1, Ri2) are not erased but highlighted so as to notify the user that the touch operation is enabled.

The shape of the paper object Po may be changed to follow the touch positions in the slide. For example, for the case in which the object is changed so as to be wound automatically when the slide distance reaches a predetermined distance, once a user performs a quick flick from one end of the paper object Po, the paper object Po is changed as if it were wound by the speed (momentum) of the flick. Once the shape of the paper object Po is changed as described above, the lock state is released and predetermined processing is executed.

For the case in which the display is changed so as to follow the touch positions during sliding, once the user slides from one end to the other end of the paper object Po, the paper object Po is changed as if it were wound carefully due to the slide.

Figure 11:
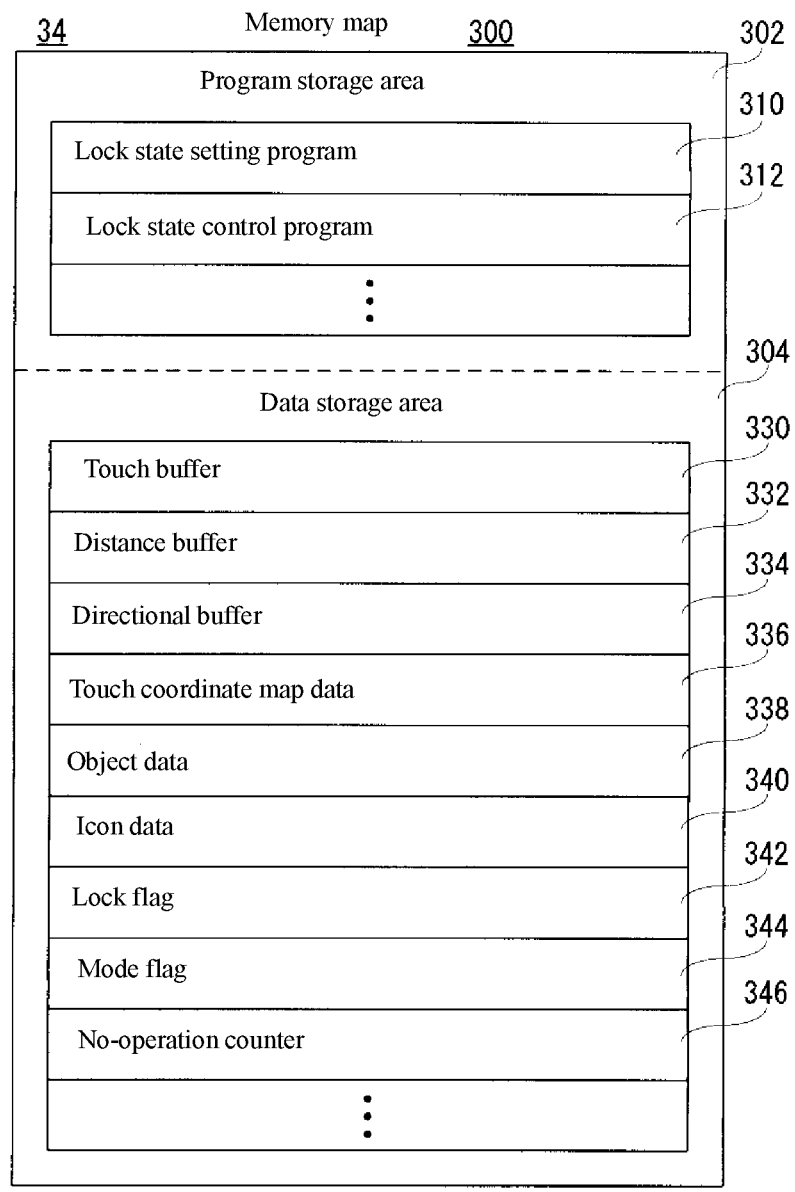
FIG. 11 is a diagram illustrating one example of a memory map of the RAM shown in FIG. 1.

FIG. 11 is a diagram illustrating a memory map 300 of the RAM 34. The memory map 300 of the RAM 34 comprises a program storage area 302 and a data storage area 304. A part of a program and data is read out from the flash memory 32 entirely at one time or partially and sequentially as desired, stored in the RAM 34, and then processed by the processor 24.

A program for operating the mobile phone 10 is stored in the program storage area 302.

For example, the program for operating the mobile phone 10 comprises a lock state setting program 310, a lock state control program 312, etc. The lock state setting program 310 is a program for setting a lock state in the mobile phone 10. The lock state control program 312 is a program for releasing the lock state that is set in the mobile phone 10 and switching a manner mode and a normal mode while maintaining the lock state.

Although not shown in the drawings, the program for operating the mobile phone 10 comprises a program for notifying of an incoming phone call state, a program for establishing a call state, etc.

The data storage area 304 comprises a touch buffer 330, a distance buffer 332, a directional buffer 334, etc., and stores touch coordinate map data 336, object data 338, icon data 340, etc. The data storage area 304 also comprises a lock flag 342, a mode flag 344, a no-operation counter 346, etc.

The touch buffer 330 temporarily stores coordinates indicating a touch point, coordinates indicating a release point, coordinates indicating a current touch position, as well as a plurality of coordinates representing a trace made from sliding, which are output from the touch panel control circuit 36. The distance buffer 332 is a buffer for storing the slide distance, that is, the distance between the touch point and the release point of the touch position. In this example, once sliding is performed, the distance between the last touch position and the current touch position is calculated in each specified cycle (for example, 30 milliseconds) and the slide distance is ascertained from the sum total of the distance that is calculated in each specified cycle. The directional buffer 334 is a buffer for storing the results of detecting the slide direction when sliding is performed in which the icons shown in FIG. 9 (A) are touch points. The slide direction is detected based on each coordinate stored in the touch buffer 330.

The touch coordinate map data 336 is data for associating a touch coordinate from the touch operation with a displayed coordinate of the display 30. That is, the processor 24 associates the results of the touch operation performed on the touch panel 38 with a display of the display 30, based on the touch coordinate map data 336. The object data 338 is image data of the paper object Po displayed on the display 30. An icon object 340 is image data of a rock icon Ri and a manner icon Mi displayed on the display 30.

The lock flag 342 is a flag for determining whether or not the lock state is set. For example, the lock flag 342 comprises a 1-bit register. Once the lock flag 342 is set to ON (established), a data value of "1" is set to the register. Once the lock flag 342 is set to OFF (not established), a data value of "0" is set to the register.

The mode flag 344 is a flag for determining whether or not the manner mode is set. Therefore, the mode flag 344 is set to ON when the manner mode is set and set to OFF when the normal mode is set.

The no-operation counter 346 is a counter for measuring a certain period of time (for example, 60 seconds), which starts counting once it is initialized. The no-operation counter 346 is also referred to as a no-operation timer, and, once the no-operation timer is executed, the no-operation counter 346 is initialized and starts counting. The no-operation timer is initialized each time a key operation or a touch operation is performed.

Although not shown in the drawings, the data storage area 304 stores a buffer for temporarily storing data that is output from a RCT, image data for displaying a GUI, etc., and comprises counters and flags that are required for operating the mobile phone 10.

Figure 12:
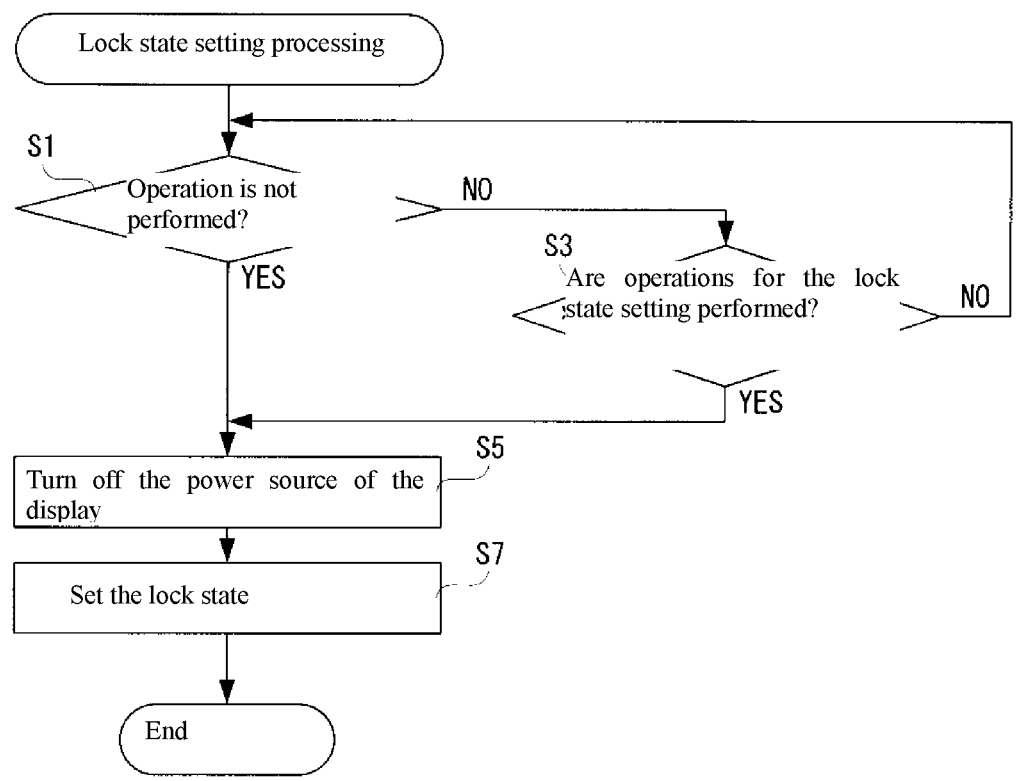
FIG. 12 is a flow diagram illustrating the lock state setting processing of the processor shown in FIG. 1.
Figure 13:
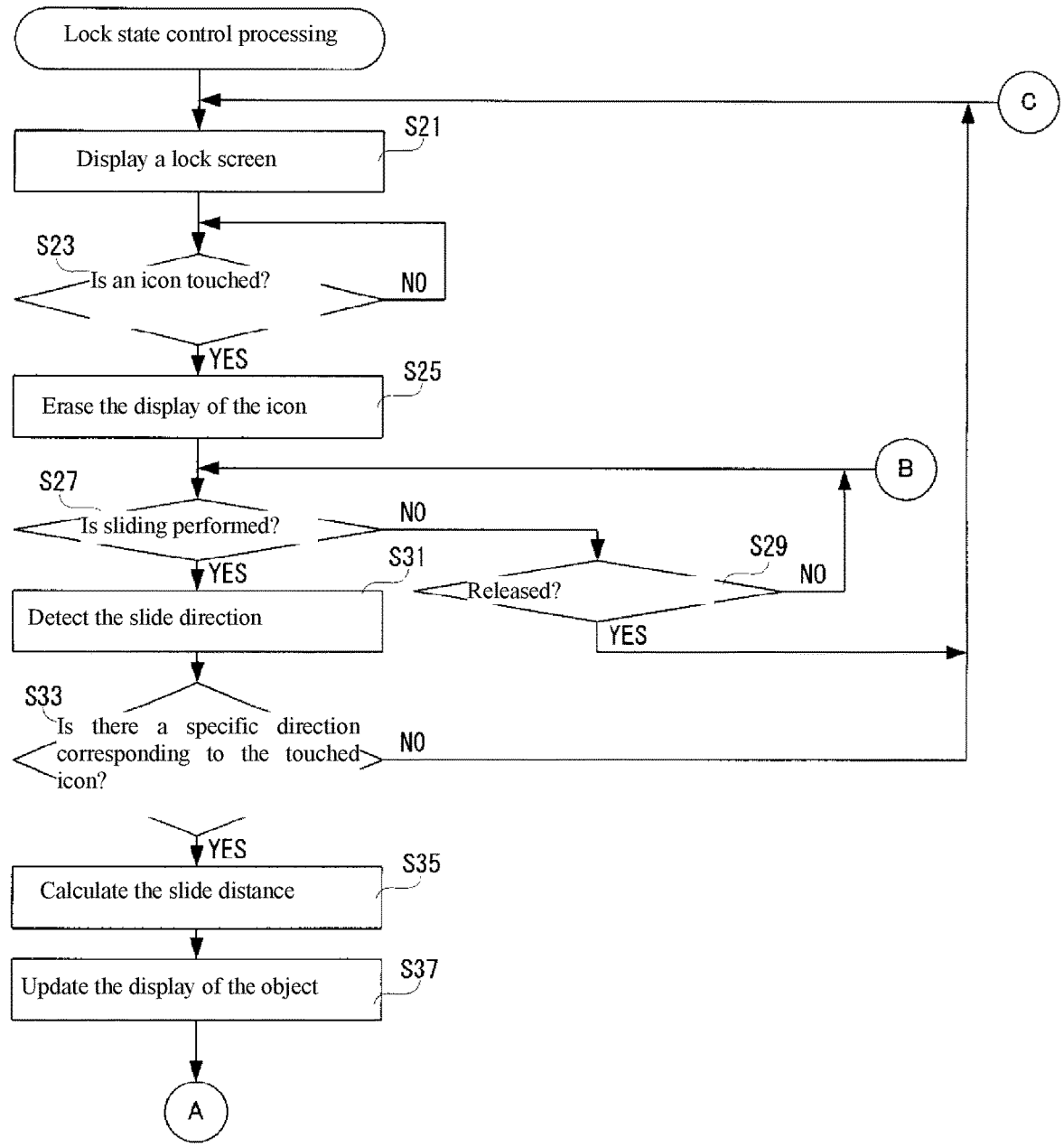
FIG. 13 is a flow diagram illustrating a part of the lock state control processing of the processor shown in FIG. 1.
Figure 14:
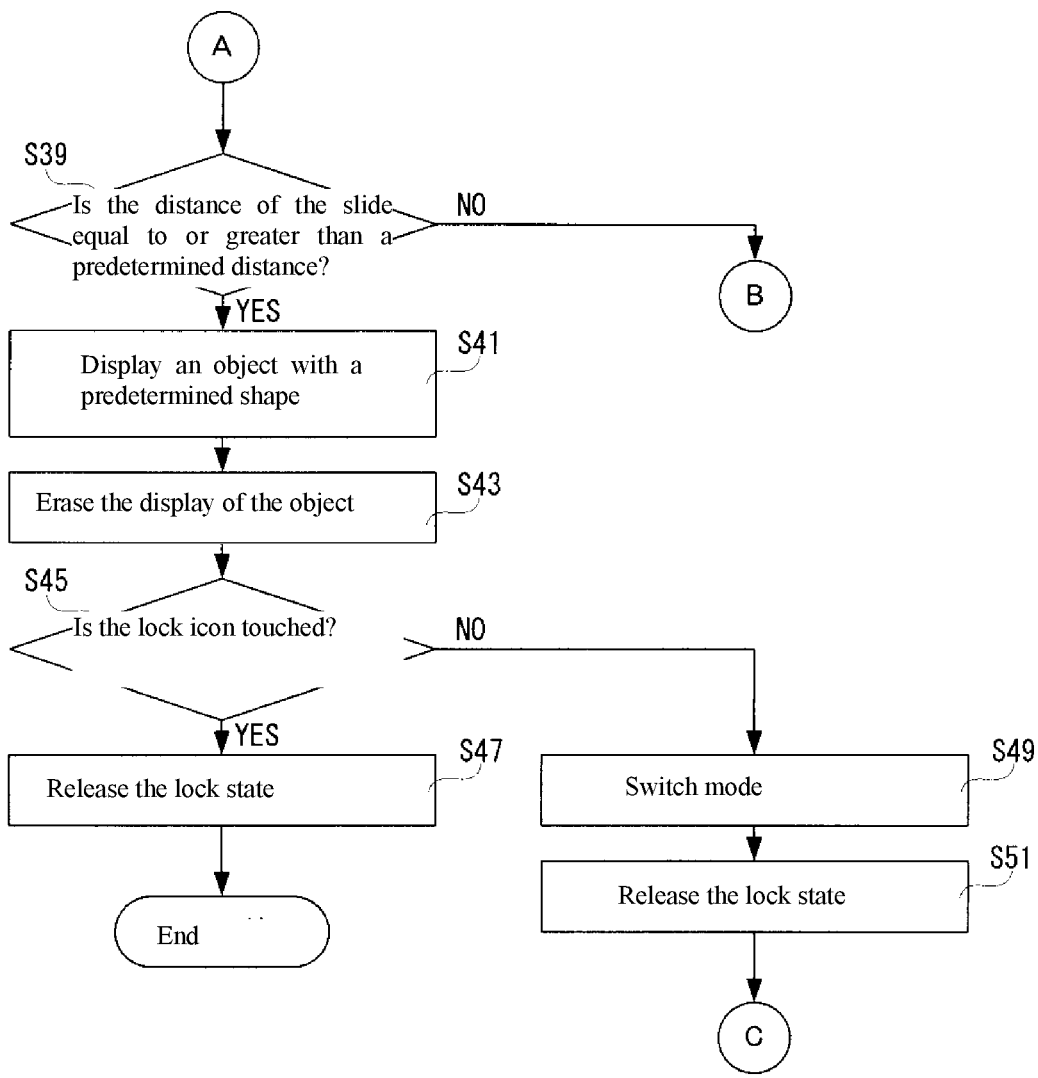
FIG. 14 is a flow diagram illustrating a part of the lock state control processing of the processor shown in FIG. 1, which follows FIG. 7.

The processor 24 processes a plurality of tasks in parallel that comprise the lock state setting processing shown in FIG. 12, the lock state control processing shown in FIG. 13 and FIG. 14, etc., under the control of a Linux (registered trademark) based OS such as Android (a registered trademark) and REX or other OSs.

FIG. 12 is a flow diagram of the lock state setting processing. For example, once the power supply for the mobile phone 10 is turned on, in step S1, the processor 24 determines whether or not any operation is performed. That is, the processor 24 determines whether or not the no-operation timer is expired due to the touch operation and the key operation not being performed for a certain period of time. If it is "YES" in step S1, for example, if the touch operation and the key operation are not performed for 60 seconds, then the processor 24 proceeds to step S5. On the other hand, if it is "NO" in step S1, that is, if the no-operation timer has not expired, then, in step S3, the processor 24 determines whether or not the operation for setting the lock state is performed. For example, the processor 24 determines whether or not the call termination key 26c is operated. If it is "NO" in step S3, that is, if the operation for setting the lock state is not performed, then the processor 24 returns to step S1.

If it is "YES" in step S3, that is, if the operation for setting the lock state is performed, then, in step S5, the processor 24 turns off the power supply for the display 30. That is, the processor 24 issues the command for turning off the power supply for the display 30 to a power supply circuit. In step S7, the processor 24 sets the lock state and terminates the lock state setting processing. In step S7, the processor 24 sets the lock flag 342 to OFF.

The power supply for the display 30 may be turned off after setting the lock state. In this case, in the lock state setting processing in the FIG. 12, the order of step S5 and step S7 is reversed. That is, in this case, the processing in step S5 is executed after executing the processing of step S7.

FIG. 13 and FIG. 14 are flow diagrams of the lock state control processing. For example, once the menu key 26b is operated while the lock state is set, in step S21, the processor 24 displays a lock screen. That is, the processor 24 displays the lock screen shown in FIG. 9 (A) on the display 30 after supplying the command for turning on the power supply for the display 30. The processor 24 executing the processing of step S21 functions as a display part.

In step S23, the processor 24 determines whether or not the icon is touched. That is, when a touch is detected by the touch panel control circuit 36, it is determined whether or not the coordinates of the touch point stored in the touch buffer 330 are comprised within the display coordinates of any one of the three rock icons Ri or the manner icon Mi. The processor 24 executing the processing of step S23 functions as a determination part.

If it is "NO" in step S23, that is, if any one of the three rock icons Ri and the manner icon Mi are not touched, then the processor 24 repeatedly executes step S23. If it is "YES" in step S23, that is, if any one of the three rock icons Ri and the manner icon Mi are touched, then, in step S25, the processor 24 erases the display of the icon. That is, the processor 24 erases the display of the three rock icons Ri or the manner icon Mi as shown in FIG. 9 (B). For the case in which the rock icon Ri3 is touched, as shown in FIG. 9 (B), the processor 24 executing the processing of step S25 changes the right side of the paper object Po into a curled shape and changes the color of the paper object Po.

In step S27, the processor 24 determines whether or not sliding is performed. That is, the processor 24 determines whether or not the movement of a finger contacting the touch panel 38 is also detected, while maintaining the detection of the touch by the touch panel control circuit 36. If it is "NO" in step S27, that is, if the touch operation for sliding is not performed on the touch panel 38, then, in step S29, the processor 24 determines whether or not release is performed. That is, the processor 24 determines whether or not the touch panel control circuit 36 detects that the finger has separated from the touch panel 38. If it is "YES" in step S29, for example, if the user separates the finger without moving it after touching an icon, then the processor 24 returns to step S21. In this case, the shape of a paper object Po that is displayed on the display 30 is initialized. If it is "NO" in step S29, for example, if the user does not move their finger at all, while maintaining the touch of an icon, then the processor 24 repeatedly executes the processing of step S27 and step S29.

If it is "YES" in step S27, for example, if the user moves their finger, while maintaining the touch on the touch panel 38, then, in step S31, the processor 24 detects the slide direction. For example, the processor 24 detects the slide direction from a touch position and a current touch position as described above. Then, the processor 24 stores data indicating a detected direction into the directional buffer 334. The processor 24 executing the processing of S31 functions as a direction detection part. For the case in which the steps S27 to S39 are repeated, in the second or subsequent processing, the direction is detected from a current touch position and the last touch position.

In step S33, the processor 24 determines whether or not it is a specific direction corresponding to a touched icon. For example, if the touched icon is the rock icon Ri3, then the processor 24 determines whether or not the direction detected by the processing of step S31 is leftwards. In step S33, a specific direction corresponding to the icon is determined based on a predetermined table. Specifically, a table in which the display coordinates of an icon and a specific direction are associated is previously stored in the data storage area 304 of the RAM 34. Once the processing of step S33 is executed, the processor 24 specifies a touched icon from a touch point and reads out the specific direction to perform the abovementioned determination.

If it is "NO" in step S33, that is, if the specific direction detected in the processing of step S31 is not the specific direction, then the processor 24 returns to step S21. That is, the display of the paper object Po is initialized. On the other hand, if it is "YES" in step S33, that is, if the detected direction is the specific direction, then, in step S35, the processor 24 calculates the slide distance. That is, the slide distance is calculated from a touch point, which is the starting point of the slide and a current touch position utilizing the Pythagorean theorem. The calculated distance is stored in the distance buffer 332. The processor 24 executing the processing of step S35 functions as a calculation part.

For the case in which the steps S27 to S39 are repeated, in the second or subsequent processing, the distance is calculated from a current touch position and the last touch position. The distance calculated by the second or subsequent processing is added to a value that is stored in the distance buffer 332. That is, the slide distance is the sum total of the moving amount from the last touch position and a current touch position. In another example, the slide distance may be calculated from a touch point and a current touch position each time when the processing of step S35 is executed.

In step S37, the processor 24 updates the display of the object. That is, as shown in FIG. 9 (C) or FIG. 10 (B), the processor 24 changes the shape of the paper object Po as if it were wound depending on the slide distance that is calculated in step S37. The processor 24 executing the processing of step S37 functions as an update part.

In step S39, the processor 24 determines whether or not the slide distance is equal to or greater than a predetermined distance. That is, the processor 24 determines whether or not the slide distance stored in the distance buffer 332 is equal to or greater than the predetermined distances. Although the data indicating this predetermined distance is stored in the program storage area 302 of the RAM 34 as part of the lock state control program 312, it may be stored in the data storage area 304 as part of variable data.

If it is "NO" in step S39, that is, if the slide distance does not reach the predetermined distance, then the processor 24 returns to step S27. That is, the processor 24 executes the processing of steps S27 to S39 again. If it is "YES" in step S39, that is, if the distance of the stored slide that is stored in the distance buffer 332 is equal to or greater than the predetermined distance, then, in step S41, the processor 24 displays the object in a completed shape (predetermined shape). For example, as shown in FIG. 9 (D) or FIG. 10 (C), the processor 24 displays the paper object Po in a fully wound shape. The processor 24 executing the processing of step S41 functions as a predetermined shape display part.

In step S43, the processor 24 erases the display of the object. For example, the processor 24 moves the paper object Po that is in a fully wound shape as if it had flown away somewhere, to erase the display of the paper object Po.

In step S45, the processor 24 determines whether or not the rock icon Ri is touched. That is, processor 24 determines whether or not the coordinates of a touch point stored in the touch buffer 330 is comprised within the display coordinates of the rock icons Ri. If it is "YES" in step S45, for example, as shown in FIG. 9 (A), FIG. 9(B), if the rock icon Ri3 is touched, then, in step S47, the processor 24 releases the lock state and terminates the lock state control processing. Once the lock state control processing is terminated, a stand-by image as shown in FIG. 9 (E) is displayed on the display 30.

If it is "NO" in step S45, for example, the coordinates indicating a touch point stored in the touch buffer 330 is comprised within the display coordinates of the manner icon Mi, then, in step S49, the processor 24 switches the mode and, in step S51, releases the lock state. Once the processing of step S51 is terminated, the processor 24 returns to step S21. For example, if the manner mode is set, then the processor 24 sets the mode flag 344 to OFF in order to switch to the normal mode. If the normal mode is set, then the processor 24 sets the mode flag 344 to ON in order to switch to the manner mode.

The processor 24 executing the processing of step S47 functions as a release part and the processor 24 executing the processing of step S49 functions as a switching part. The processor 24 executing the processing of step S47, S49, S51 functions as an execution part.

In the lock state control processing shown in FIG. 13 and FIG. 14, the processing of steps S31 to S35 and step S39 may be omitted. In this case, if sliding is performed from a displayed icon regardless of the slide distance and direction, the release of the lock state or switching between the manner mode and the normal mode is executed. The processing of step S51 may be omitted. In this case, the modes can be switched without releasing the lock state.

As can be seen from the abovementioned description, the mobile phone 10 comprises a touch panel on which touch operations such as sliding are performed. The mobile phone 10 comprises a lock function that prevents predetermined processing from being executed based on a touch operation, and a manner mode function. Once a key operation is performed while the lock state is set, the paper object Po that is generally quadrilateral is displayed on the display 30 and the three rock icons Ri and the manner icon Mi are also displayed on each side of the paper object Po. A user can release the lock state by performing a slide operation so as to wind the paper object Po after touching any one of the rock icons Ri. The user can change the manner mode and the normal mode by performing a slide operation by winding the paper object Po after touching the manner icons Mi.

In this way, operations for releasing the lock state and switching the mode can be induced to the user regardless of the language utilized by the user.

In this example, although processing for switching between the manner mode and the normal mode is executed as predetermined processing, other processing comprised with the mobile phone 10 may be executed. For example, processing for displaying a transmission mail creation screen along with releasing the lock state, processing for displaying a list of mail folders, processing for displaying a mail transmission and reception history, processing for displaying an HP on a server, processing for displaying an alarm setting screen, processing for responding to incoming calls, etc. may be executed. Predetermined processing executed along with releasing the lock state can be arbitrarily set by a user. In this way, the mobile phone 10 can execute various processing along with releasing the lock state.

An image in relation to predetermined processing may be utilized for an icon corresponding to predetermined processing such as the manner icon Mi. Accordingly, the user can easily realize the predetermined processing corresponding to the icon by viewing the image shown by the icon.

Figure 15:
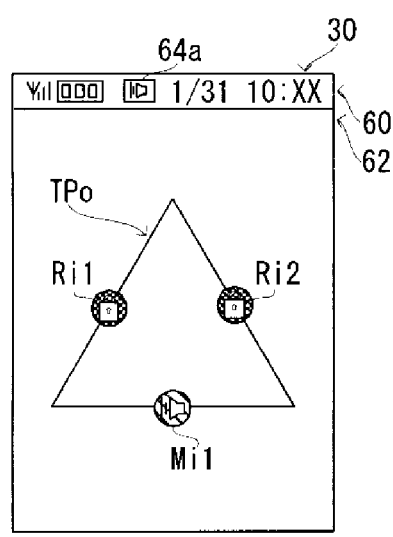
FIG. 15 is a schematic diagram illustrating another example of a paper object displayed on the display shown in FIG. 1.
Figure 16:
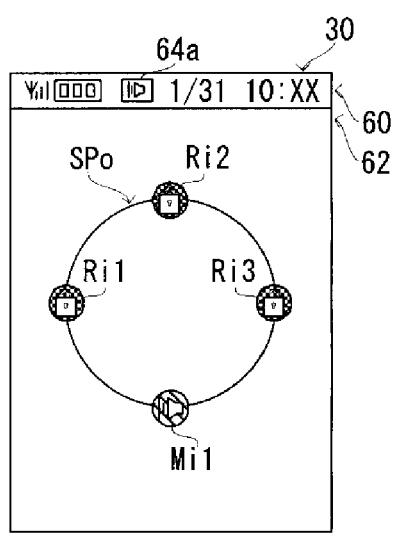
FIG. 16 is a schematic diagram illustrating another example of a paper object displayed on the display shown in FIG. 1.

In this example, although the shape of the paper object Po is generally quadrilateral, it may be other polygons and circles. For example, a triangular paper object TPo on which the rock icons Ri and the manner icon Mi1 are comprised on the three sides as shown in FIG. 15 may be utilized, or a circular paper object SPo on which the rock icons and the manner icon Mi are comprised on the circumference as shown in FIG. 16 may be utilized. A specific region in relation to the paper object Po may be not only the edge (side, circumference) of the object but also the inside, the outside, a corner (vertex), etc.

The rock icon Ri and the manner icon Mi may be comprised on the same side. In this case, a specific direction corresponding to two icons may be the same direction or a different direction.

The rock icon Ri and the manner icon Mi may be comprised at the same position and alternately displayed at a predetermined cycle (for example, 1 second). That is, the same icon may be selectively used. For example, for the case in which a common icon functioning as the rock icon Ri or the manner icon Mi is used, the color and the shape of the common icon may be periodically changed. In this case, the color of the common icon may be periodically switched between red (manner) and green (rock), and the shape of the common icon may be switched periodically between a triangle (manner) and a quadrilateral (rock). The color and shape of the common icon may be switched periodically as described above.

In this example, although during sliding, once the slide direction is reversed, the shape of the paper object Po is initialized, in another example, for the case in which sliding is performed in the reverse direction, the shape of the paper object Po may be restored following sliding.

The mobile phone 10 may comprise other modes such as a drive mode that is utilized when driving a car, in addition to the manner mode. In the lock screen, the abovementioned drive mode, etc. may be switched in the same way as the manner mode.

The time, the remaining capacity of the rechargeable battery, etc. that are displayed on the status display area 60 may be displayed inside the paper object Po.

Although the communication mode of the mobile phone 10 is a CDMA system, it may employ a LTE (Long Term Evolution) system, a W-CDMA system, a GSM system, a TDMA system, a FDMA system, a PHS system, etc. Although an LCD monitor is utilized as the display 30, other display monitors such as organic EL panels may be utilized.

The lock state setting program 310 and the lock state control program 312 may be stored in a HDD for data distribution and delivered to the mobile phone 10 via a network. Storage media such as optical disks including CDs, DVDs, and BDs (Blu-ray Disc), USB memory, memory cards, etc. may be sold or distributed in the state in which these programs are stored in these storage media. For the case in which the lock state setting program 310 and the lock state control program 312 which are downloaded through the abovementioned server and a storage medium are installed in a mobile phone with a similar configuration as that of the present example, similar effects may be obtained.

The mobile phone 10 may be a smart phone, a PDA (Personal Digital Assistant), etc.

Any specific numerical value such as a predetermined period of time, a predetermined distance, a certain cycle, a certain period of time, a predetermined cycle, etc. is a mere example and is appropriately changeable according to the needs of product specifications.

While at least one exemplary embodiment is presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

What is claimed is:

1. A mobile electronic device that can set and release a lock state, the device comprising:

a display operable to display a first screen in a lock state, the first screen comprising a first display object;
a touch panel coupled to the display, and operable to detect a touch on the first screen, a move of the touch and a release of the touch;
at least one controller configured to cause the display to display the first display object based on one or more graphical elements, operable to:
move the first display object in a moving direction of the touch on the first screen and change at least one of the one or more graphical elements in response to detecting the move of the touch on the first screen;
delete the first display object from the first screen in response to a further detecting of the move of the touch after moving the first display object and changing the at least one of the one or more graphical elements; and
release the lock state after deleting the first display object.

2. The mobile terminal according to claim 1, wherein the at least one controller further gradually displays the first screen by moving a second screen on at least one display area in a specific direction.

3. The mobile terminal according to claim 1, wherein when the lock state is released, the at least one controller further displays the first screen on a position where the first screen was displayed on at least one display area before releasing the lock state.

4. The mobile terminal according to claim 1, wherein when the touch operation is terminated in the lock state, the at least one controller further returns the display of a second screen to a previous position where the touch panel detected the touch operation in the lock state.

5. The mobile electronic device according to claim 1, wherein the at least one controller is further operable to cause the display to:
display a second display object; and
substitute the second display object with a third display object when the second display object reaches a predetermined area on the display.

6. The mobile electronic device according to claim 5, wherein the at least one controller is further operable to keep the lock state when the release is detected on an area different from the predetermined area.

7. The mobile electronic device according to claim 1, wherein the at least one controller is further operable to cause the display to display a second screen to execute a predetermined process upon releasing the lock state.

8. The mobile electronic device according to claim 7, wherein the predetermined process comprises an email-related process.

9. The mobile electronic device according to claim 7, wherein the predetermined process comprises an internet-related process.

10. The mobile electronic device according to claim 7, wherein the predetermined process comprises a phone-related process.

11. A method for controlling a lock state of a mobile terminal, the method comprising:
displaying a first screen on a display in the lock state, the first screen comprising a first display object;
detecting a touch on the first screen;
controlling displaying the first display object based on one or more graphical elements;
moving the first display object in a moving direction of the touch on the first screen and changing at least one of the one or more graphical elements in response to detecting the move of the touch on the first screen;
deleting the first display object from the first screen in response to a further detecting of the move of the touch after moving the first display object and changing the at least one of the one or more graphical elements; and
changing the lock state to an unlock state after deleting the first display object.

12. The method of claim 11, further comprising:
displaying a second display object; and
substituting the second display object with a third display object upon changing the lock state to the unlock state.

13. The method of claim 11, further comprising:
displaying a second screen to execute a predetermined process upon releasing the lock state.

14. The method of claim 11, wherein the predetermined process comprises an email-related process.

15. The method of claim 11, wherein the predetermined process comprises an internet-related process.

16. The method of claim 11, wherein the predetermined process comprises a phone-related process.

17. A non-transitory computer readable medium for a mobile electronic device, the computer readable medium comprising program for:
displaying a first screen on a display in a lock state, the first screen comprising a first display object;
detecting a touch on the first screen;
controlling displaying the first display object based on one or more graphical elements;
moving the first display object in a moving direction of the touch on the first screen and changing at least one of the one or more graphical elements in response to detecting the move of the touch on the first screen;
deleting the first display object from the first screen in response to a further detecting of the move of the touch after moving the first display object and changing the at least one or more graphical elements; and
changing the lock state to an unlock state after deleting the first display object.

18. The non-transitory computer readable medium of claim 17, wherein the program displays a second display object and substitutes the second display object with a third display object upon changing the lock state to the unlock state.

19. The non-transitory computer readable medium of claim 17, wherein the program displays a second screen to execute a predetermined process upon releasing the lock state.

* * * * *